US012808329B2

(12) United States Patent
Pritt et al.

(10) Patent No.: US 12,808,329 B2
(45) Date of Patent: Nov. 24, 2026

(54) TRANSMISSION SYSTEMS TO SELECTIVELY TRANSFER POWER OF A TURBINE ENGINE

(71) Applicants: The Boeing Company, Arlington, VA (US); Kawasaki Jukogyo Kabushiki Kaisha, Hyogo (JP)

(72) Inventors: Marshall Edward Pritt, Philadelphia, PA (US); Scott Hendrik Bouwer, Wilmington, DE (US); Chetan Bhagwandas Megchiani, Bothell, WA (US); Jacob Bevan McWhirter, Lake Stevens, WA (US); Tatsuhiko Goi, Hyogo (JP); Kenichiro Tanaka, Hyogo (JP); Shuma Kobayashi, Hyogo (JP); Kengo Shinohara, Hyogo (JP); Joseph M. Dirusso, Snohomish, WA (US)

(73) Assignees: THE BOEING COMPANY, Arlington, VA (US); KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 18/795,629

(22) Filed: Aug. 6, 2024

(65) Prior Publication Data

US 2026/0043356 A1 Feb. 12, 2026

(51) Int. Cl.
*F02C 7/32* (2006.01)

(52) U.S. Cl.
CPC .......... *F02C 7/32* (2013.01); *F05D 2220/323* (2013.01); *F05D 2260/4023* (2013.01)

(58) Field of Classification Search
CPC .... F02C 7/32; F02C 7/36; F02C 3/107; F05D 2220/323; F05D 2260/40; F05D 2260/4023
See application file for complete search history.

(56) References Cited

U.S. PATENT DOCUMENTS 5,694,765 A * 12/1997 Hield .................... F02C 3/113 60/39.163
7,481,062 B2 1/2009 Gaines et al.
(Continued)

FOREIGN PATENT DOCUMENTS

CA 2968553 A1 12/2017
CN 118618617 A 9/2024
(Continued)

OTHER PUBLICATIONS

EP Search Report mailed Dec. 11, 2025 in re EP Application No. 25192350.4.

(Continued)

*Primary Examiner* — Elton K Wong
(74) *Attorney, Agent, or Firm* — COATS & BENNETT, PLLC

(57) ABSTRACT

A transmission operatively connected to a turbine engine of an aircraft to selectively transfer power from a first pressure spool of the turbine engine to a second pressure spool of the turbine engine and to power an accessory. The transmission is configured to selectively operate in one of a first configuration and a second configuration. The first configuration transfers power from the turbine engine to the accessory and the second configuration transfers power from the first pressure spool to the second pressure spool.

20 Claims, 22 Drawing Sheets

(56) References Cited

U.S. PATENT DOCUMENTS

| | | | | |
|---|---|---|---|---|
| 7,833,126 | B2 | 11/2010 | Venter | |
| 9,810,158 | B2 | 11/2017 | Foutch et al. | |
| 10,054,051 | B2 | 8/2018 | Foutch et al. | |
| 10,100,744 | B2 | 10/2018 | Mackin et al. | |
| 10,794,330 | B2 | 10/2020 | Razak et al. | |
| 10,954,865 | B2 | 3/2021 | Mackin | |
| 11,333,077 | B2 | 5/2022 | Foutch et al. | |
| 11,591,967 | B2 | 2/2023 | Foutch et al. | |
| 11,898,499 | B1 | 2/2024 | Dirusso | |
| 12,098,682 | B1 | 9/2024 | Dirusso | |
| 2006/0005544 | A1 | 1/2006 | Herlihy | |
| 2006/0272313 | A1 | 12/2006 | Eick et al. | |
| 2007/0173365 | A1 | 7/2007 | Linet et al. | |
| 2010/0167863 | A1 | 7/2010 | Lemmers, Jr. | |
| 2016/0053691 | A1* | 2/2016 | Ernst | F02C 9/28 415/121.3 |
| 2016/0167790 | A1* | 6/2016 | Hipsky | F02C 7/36 74/15.4 |
| 2017/0363014 | A1* | 12/2017 | Taylor | F02C 7/32 |
| 2018/0223740 | A1* | 8/2018 | Forest | F02C 7/268 |
| 2019/0186289 | A1* | 6/2019 | Dhabade | F01D 21/12 |
| 2020/0355122 | A1 | 11/2020 | Foutch et al. | |
| 2020/0400078 | A1 | 12/2020 | Hanrahan et al. | |
| 2021/0040893 | A1 | 2/2021 | Finke et al. | |
| 2022/0195884 | A1* | 6/2022 | Foutch | F02C 7/32 |
| 2022/0356849 | A1 | 11/2022 | Gilson et al. | |
| 2023/0096526 | A1 | 3/2023 | Valois | |

FOREIGN PATENT DOCUMENTS

| | | | |
|---|---|---|---|
| EP | 3736422 | A1 | 11/2020 |
| EP | 4036392 | A1 | 8/2022 |
| JP | 6553636 | B2 | 7/2019 |

OTHER PUBLICATIONS

EP Search Report mailed Mar. 17, 2026 in re EP Application No. 25202035.9.

* cited by examiner

TRANSMISSION SYSTEMS TO SELECTIVELY TRANSFER POWER OF A TURBINE ENGINE

TECHNOLOGICAL FIELD

The present disclosure relates generally to the field of turbine engines and, more specifically, to transmission systems to selectively transfer power of a turbine engine.

BACKGROUND

Various aircraft are driven by turbine engines. These engines include a fan that provides a significant fraction of the overall propulsion system thrust. An engine core drives the fan and produces additional thrust by directing exhaust products in an aft direction. In addition to providing thrust to propel the aircraft, the turbine engine provides power to aircraft systems in the form of shaft power and pneumatic bleed air.

When the aircraft is on the ground with the engine operating at idle, the turbine engine produces shaft power for aircraft operation. The shaft power is typically taken from the core shaft of the engine (also called N2 or high spool). Shaft power extraction from the high spool during ground operation results in increased ground idle fuel flow, thrust, and causes a decrease in high pressure compressor stability margin.

The turbine engine can also be configured to provide pneumatic bleed air to an aircraft system. The aircraft system includes one or more components such as but not limited to an environmental control system to pressurize a passenger cabin of the aircraft and thermal anti-icing systems to provide heated air for anti-icing applications. Air supply to the aircraft system is typically provided by bleed air extracted from the high pressure compressor of the turbine engine.

Alternatively, aircraft pneumatic bleed air can be provided by an auxiliary compressor that uses shaft power and air from a lower stage of the engine compressor. The auxiliary compressor is operated to provide the air to the aircraft system at the needed pressure levels.

There is a need for a system to provide for efficient operation of the turbine engine.

SUMMARY

One aspect is directed to a transmission operatively connected to a turbine engine of an aircraft to selectively transfer power from a first pressure spool of the turbine engine to a second pressure spool of the turbine engine and to power an accessory. The transmission comprises a speed changing element, a power transfer clutch, an accessory clutch, and a gearset. The transmission is configured to selectively operate in one of a first configuration and a second configuration. Wherein the first configuration transfers power from the turbine engine to the accessory. Wherein the second configuration transfers power from the first pressure spool to the second pressure spool.

In another aspect, the transmission is configured to operate in a third configuration that prevents the transfer of power from the turbine engine to the accessory and prevents the transfer of power from the first pressure spool to the second pressure spool.

In another aspect, the first configuration comprises the accessory clutch engaged to transfer power from the turbine engine to the accessory, the second configuration comprises the power transfer clutch engaged to transfer power from the first pressure spool to the second pressure spool, and the third configuration comprises engagement of neither of the accessory clutch nor the power transfer clutch.

In another aspect, the first configuration prevents the transfer of power from the first pressure spool to the second pressure spool and the second configuration prevents the transfer of power from the turbine engine from being transferred to the accessory.

In another aspect, the transmission is configured to transfer power from the second pressure spool to the first pressure spool.

In another aspect, the speed changing element is powered by the second pressure spool in the first configuration.

In another aspect, the power transfer clutch and the accessory clutch are contained within a single housing that is configured to receive power from the first pressure spool and the second pressure spool.

In another aspect, a piston extends within the housing, accessory clutch plates are connected to the piston, power transfer clutch plates are connected to the piston, wherein the accessory clutch plates are engaged in the first configuration, and wherein the power transfer clutch plates are engaged in the second configuration and wherein neither of the accessory clutch plates nor the power transfer clutch plates are engaged in third configuration.

In another aspect, a one-way differential gearset prevents sharing of power between the first pressure spool and the second pressure spool in the first configuration.

In another aspect, the power transfer clutch comprises a one-way clutch mechanism.

In another aspect, a controller with processing circuitry is configured to operate the transmission in the first configuration to drive the accessory, in the second configuration to transfer the power produced from the first pressure spool to the second pressure spool, and in the third configuration that prevents the transfer of the power from the turbine engine to the accessory and from the first pressure spool to the second pressure spool.

One aspect is directed to a transmission operatively connected to a turbine engine of an aircraft to selectively transfer power from a first pressure spool of the turbine engine to a second pressure spool of the turbine engine and to power an accessory to deliver air to an aircraft system. The transmission comprises a speed changing element operatively connected to and powered by the second pressure spool, a power transfer clutch operatively connected to the first pressure spool, an accessory clutch operatively connected to the speed changing element, wherein the power transfer clutch and the accessory clutch are configured in a first configuration to transfer power from the second pressure spool to the accessory to power the accessory, and wherein the power transfer clutch and the accessory clutch are configured in a second configuration to transfer power from the first pressure spool to the second pressure spool.

In another aspect, a gearset operatively connects to each of the second pressure spool and the first pressure spool with the gearset configured to transfer the power from the first pressure spool to the second pressure spool in the second configuration.

In another aspect, each of the speed changing element, the power transfer clutch, and the accessory clutch are separate components.

In another aspect, a controller with processing circuitry is configured to operate the transmission in the first configuration to drive the accessory and in the second configuration to transfer the power produced from the first pressure spool to the second pressure spool.

One aspect is directed to a method for use with a turbine engine of an aircraft with the method comprising: positioning a transmission in a first configuration and transferring power from the turbine engine through a speed changing element and accessory clutch to an accessory to deliver air from the turbine engine to an aircraft system, and positioning the transmission in a second configuration and transferring power from a first pressure spool of the turbine engine through a power transfer clutch and the speed changing element to a second pressure spool of the turbine engine.

In another aspect, the method further comprises preventing power from being transferred from the turbine engine to the accessory in the second configuration.

In another aspect, the method further comprises in the first configuration transferring the power from the second pressure spool of the turbine engine to the accessory.

In another aspect, the accessory is a compressor and the method further comprises providing air to the aircraft system through a bleed air system when the transmission is in the first configuration.

In another aspect, the method further comprises in the first configuration, engaging the accessory clutch and disengaging the power transfer clutch and transferring the power from the turbine engine to the accessory, and in the second configuration, engaging the power transfer clutch and disengaging the accessory clutch and transferring the power from the first pressure spool of the turbine engine to the second pressure spool of the turbine engine.

The features, functions and advantages that have been discussed can be achieved independently in various aspects or may be combined in yet other aspects, further details of which can be seen with reference to the following description and the drawings.

DETAILED DESCRIPTION

Figure 1:
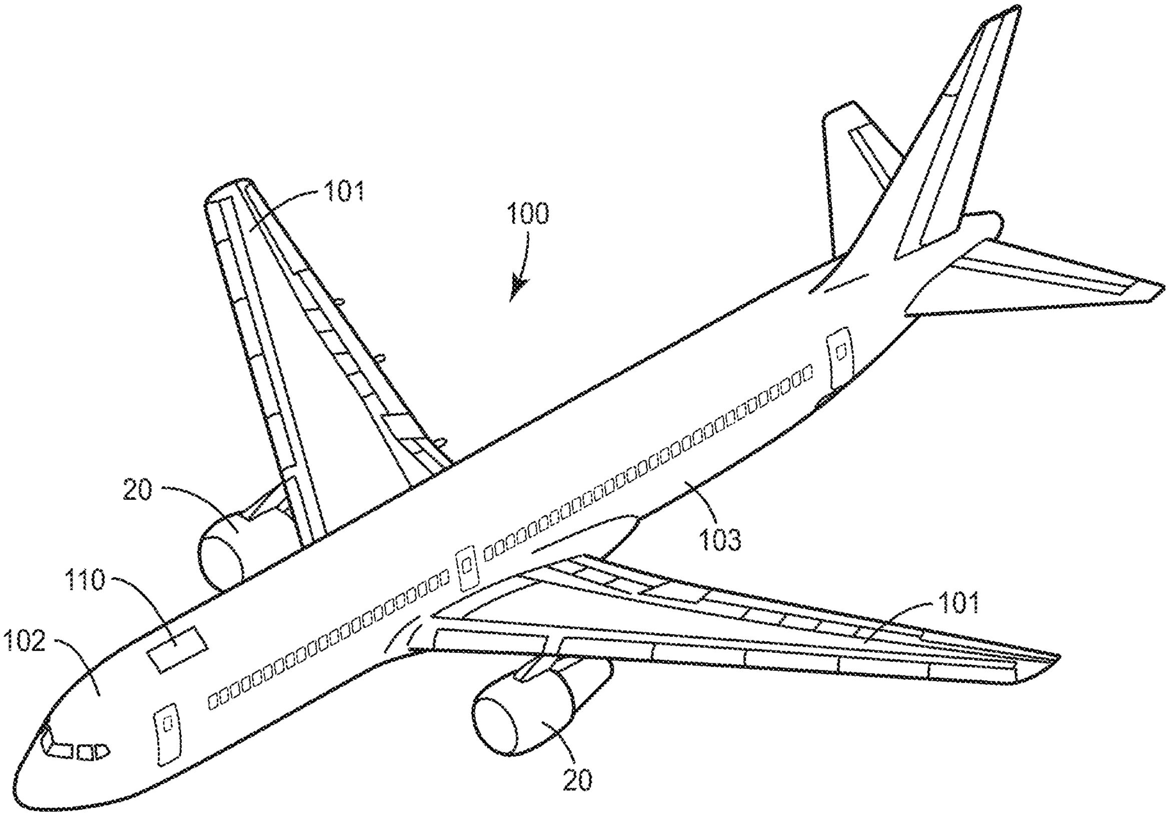
FIG. 1 is an isometric diagram of an aircraft.

FIG. 1 illustrates an example of an aircraft 100. The aircraft 100 generally includes a fuselage 103 and wings 101. One or more turbine engines 20 are mounted to the wings 101 to propel the aircraft 100. A flight deck 102 is positioned at the front of the fuselage 103 and includes controls that provide for operating the aircraft 100. A rearward section of the fuselage 103 includes a cabin area configured to accommodate passengers or cargo.

The aircraft 100 includes an aircraft system 110 that includes one or more systems for operating various components including but not limited to an environmental control system, a wing anti-icing system, an engine anti-icing system and various others that utilize heated and/or pressurized air. One or more of the turbine engines 20 supply bleed air to the aircraft system 110 for use with one or more of the components such as in the environmental control system. The bleed air can be supplied during various operating conditions such as but not limited to ground operation (taxi), take-off or climb, cruise, hold, and descent.

The engines 20 provide thrust to propel the aircraft, and power the aircraft hydraulic and pneumatic systems. The engines 20 also provide shaft power for the aircraft electrical system, including the aircraft system 110, aircraft computers, motor-driven hydraulic pumps, and/or other motors and electrical devices and accessories.

As aircraft accessory power demands have increased, there has been an increased need to run the turbine engine 20 at higher idle speeds. More specifically, increasing engine idle speed enables increased power demands to be met without sacrificing compressor stall margins. However, the increased idle speed may also generate thrust levels for the turbine engine 20 that is higher than desired for both flight idle descent operations and/or during ground idle operations. Over time, continued operation with increased thrust levels during such idle operations may increase maintenance costs of aircraft brakes, and the increased fuel flow directly increases aircraft operating expenses.

This application is directed to systems 15 for transferring power of a turbine engine 20 for efficient operation of the aircraft 100. In some examples, an engine 20 is configured to generate power to power an accessory 60. In some examples, a first one of the engines 20 propels the aircraft 100 and is operated to generate power and provide bleed air. In some examples, two or more of the turbine engines 20 operate to generate power and provide bleed air and therefore includes the same components and operates in the same manner. The disclosure below includes operation of a single turbine engine 20. It is understood that two or more of the engines 20 can operate in substantially the same manner to provide power transfer to meet the demands of the aircraft 100.

Figure 2:
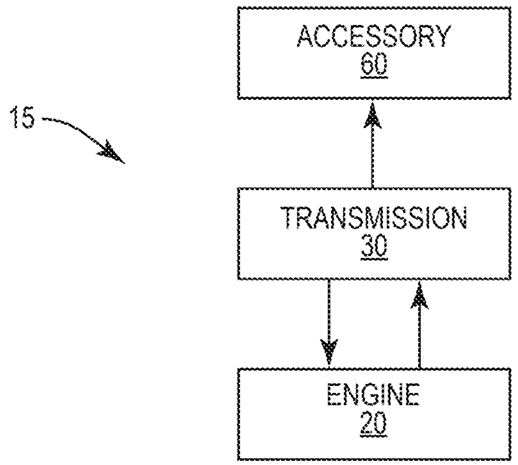
FIG. 2 is a schematic diagram of a transmission that provides for selectively transferring power among the engine and compressor.

Power from one or more of the turbine engines 20 is mechanically transferred to efficiently operate aspects of the aircraft 100. As schematically illustrated in FIG. 2, a transmission 30 is configured to selectively transmit power from a turbine engine 20. The transmission 30 is configured to transmit power to an accessory 60. The transmission 30 is also configured to transfer power within the turbine engine 20. In one example, the transmission 30 includes a speed changing element 33, a power transfer clutch 34, and an accessory clutch 35.

The system 15 solves two problems associated with a conventional aircraft. A first problem is it provides power to an accessory. In one specific example in which the accessory is a compressor, the first problem that is solved is that bleed air supply is often inefficient due to the turbine engine providing air at a higher pressure than is required by the aircraft systems. A second problem that is solved is that engine operability results in higher than desired idle levels, particularly for ground idle conditions.

The architecture is configured to provide power to a variety of different devices, such as various airframe accessories and various engine accessories. One example includes a compressor that is driven to supply air to the aircraft 100. Other examples of accessories 60 include but are not limited to electrical generators, hydraulic pumps, fuel pumps, and oil pumps.

Some of the examples below include the accessory 60 being a compressor. However, a compressor is just one example of the various devices that can be powered through the present configuration disclosed in this application.

Figure 3:
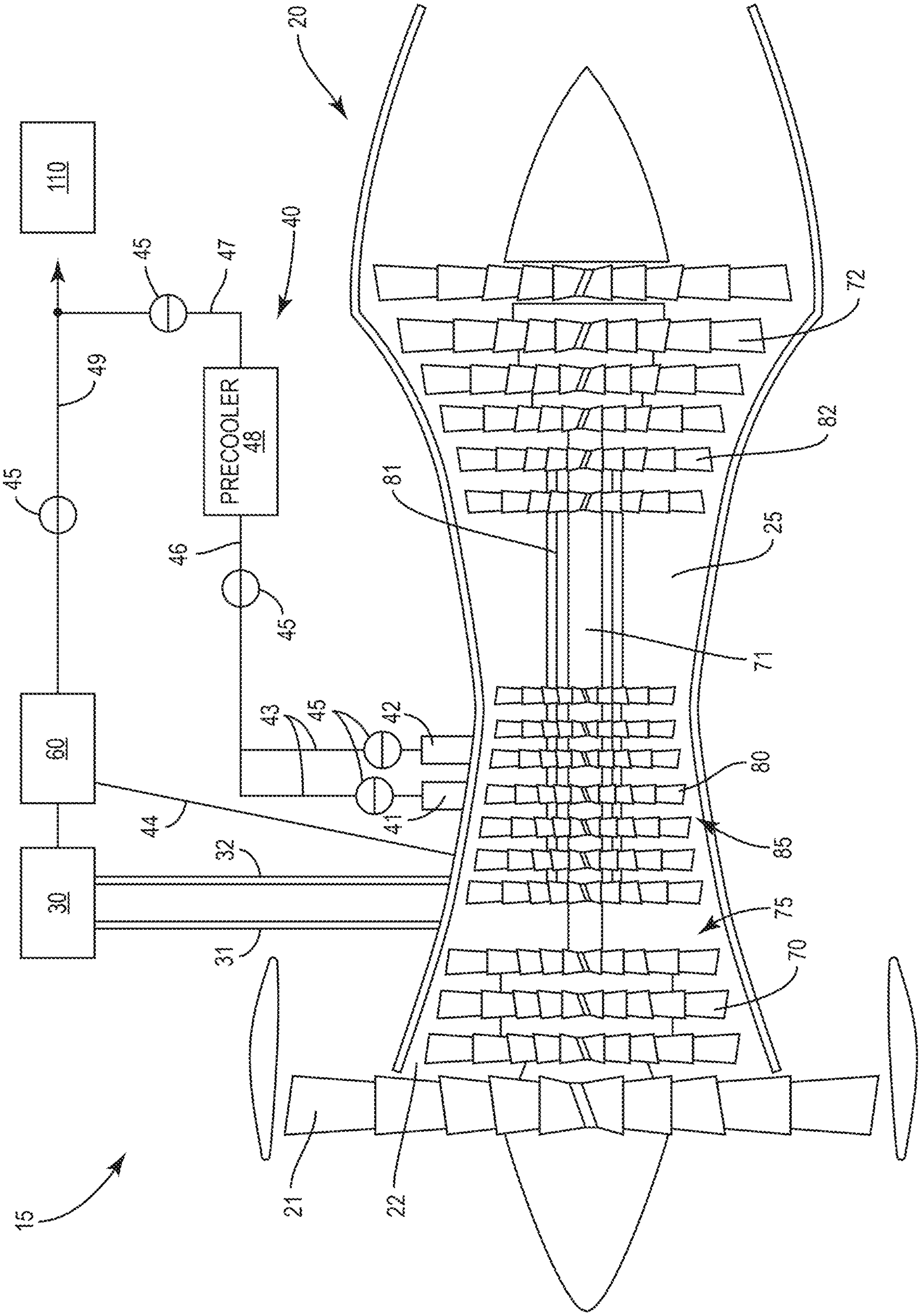
FIG. 3 is a schematic diagram of a turbine engine and a transmission that transfers power among the engine and a compressor of a bleed air system.

FIG. 3 illustrates a schematic diagram of the turbine engine 20 and the architecture to transfer power and with a compressor 60 configured to supply air to the aircraft system 110. The turbine engine 20 includes a fan 21 that draws air into a fan duct or compressor intake section and into a compressor 22. The compressor 22 includes one or more compressor sections. In some examples as illustrated in FIG. 2, the compressor 22 is a dual-axial compressor 22 that includes a low pressure compressor 70 and a high pressure compressor 80. In some examples, the low pressure compressor 70 and the high pressure compressor 80 include various compressor stages that progressively increase the pressure of the air as the air flows from an input section at the fan 21 to a combustion chamber 25.

The low pressure compressor 70 is operatively coupled to a low pressure shaft 71 and the high pressure compressor 80 is operatively coupled to a high pressure shaft 81. The low pressure shaft 71 is further coupled to a low-pressure turbine 72 and the high pressure shaft 81 is coupled to a high-pressure turbine 82. In some examples as illustrated in FIG. 3, the shafts 71, 81 are co-linearly aligned with the first shaft 71 positioned within an interior of the second shaft 81.

In this example, the compressor 22 is a dual-axial compressor that includes the two compressors 70, 80. However, in other examples, the compressor 22 may include more compressor sections, each having, for example, a turbine and respective shaft.

After exiting the high pressure compressor 80, the highly pressurized air is provided to the combustion chamber 25 where fuel is injected and mixed with the highly pressure air and ignited. The high energy airflow exiting the combustion chamber 25 turns blades of the turbines 72, 82 which are coupled to respective ones of the shafts 71, 81. Rotation of the shafts 71, 81 turns blades of the compressors 70, 80. The heated air is exhausted via a nozzle 26 where it mixes with cool air, provided by the fan 21 that bypasses the engine core to produce forward thrust.

The low pressure components including the low pressure compressor 70, low pressure shaft 71, and low pressure turbine 72 form a low pressure spool 75. The high pressure components including the high pressure compressor 80, high pressure shaft 81, and high pressure turbine 82 form a high pressure spool 85.

A bleed air system 40 supplies engine bleed air for use by the aircraft system 110 in the various operation conditions. The bleed air system 40 includes one or more ports that pull air from the turbine engine 20. In some examples as illustrated in FIG. 3, the bleed air system 40 includes a first bleed port 41 and a second bleed port 42. The second bleed port 42 is disposed downstream of the first bleed port 41 and as a result the pressure of the bleed air supplied by the second bleed port 42 is higher than the pressure of the bleed air supplied by the first bleed port 41. Passageways 43 lead from the ports 41, 42 and can include one or more valves 45 to control the flow of air. Valves 45 include various configurations including but not limited to one-way valves, check valves, pressure regulating valves, and shut-off valves. The initial passageways 43 lead into larger passageway 46. In some examples, the temperature of the bleed air supplied by the first and second ports 41, 42 is elevated. The bleed air flows through a precooler 48 to reduce the temperature. Air is output into a passageway 47 and directed to the aircraft system 110.

A separate passageway 44 leads from the engine 20 to the compressor 60. In some examples, the compressor 60 is a shaft-driven compressor (SDC). The compressor 60 has a high horsepower capacity (e.g., 250 HP, 400 HP) and can be operated at specific rotational speeds to stay on its operating map. The compressor 60 compresses the bleed air received through the passageway and supplies the compressed air through passageway 49 to the aircraft system 110. In some examples, the compressor 60 receives the bleed air through the passageway 44, boosts the bleed air to a higher pressure, and outputs the air through the passageway 49 to meet the demands of the aircraft system 110. One or more valves 45 can be positioned along the passageway 49 to control the flow of the bleed air.

The transmission 30 transfers power from the turbine engine 20 to operate the compressor 60. The transmission 30 modulates or controls a gear ratio to drive the compressor 60 at a desired rotational speed or to result in a desired torque or power transfer. A high pressure drive mechanism 31 and a low pressure drive mechanism 32 provide for transferring power from the turbine engine high spool 85 to the transmission 30. The drive mechanisms 31, 32 can include various configurations, such as but not limited to shafts, gear trains, and pulleys. In some examples, a gear box (not illustrated) is connected to the drive mechanisms 31, 32 and transmission 30. The gear box includes a drive train with multiple gears to set a speed of the components. The transmission 30, the high pressure drive mechanism 31 and the low pressure drive mechanism 32 mechanically link the lower pressure spool 75 to the high pressure spool 85. The drive mechanisms 31, 32 can be coupled to the spools 75, 85 in various manners. In some examples, the coupling is through a gear train (e.g., comprising bevel gears) that extends between the ends of the drive mechanism 31, 32 and the respective spool 75, 85.

In addition to powering the compressor 60, the transmission 30 is also configured to transfer mechanical power in the turbine engine 20. Mechanical power from excess available power on the low pressure spool 75 can be directed back into the high pressure spool 85 allowing required speed of the high pressure spool 85 to be maintained, but with reduced fuel flow. Further, extracting power from the low pressure spool 75 reduces the rotational speed of the low pressure spool 75 which in turn reduces the rotational speed of the fan 21. Thus, unwanted fan thrust is reduced and the engine 20 can utilize the excess power to operate additional accessories of the aircraft system 110 without increasing fuel flow. As a result, beneficially, at idle both thrust of the turbine engine 20 and fuel flow are reduced.

The transfer of power from the low pressure spool 75 to the high pressure spool 85 can occur at times when the turbine engine 20 is producing excess thrust that can be harvested from the low pressure spool 75 to power the high pressure spool 85.

Figure 4:
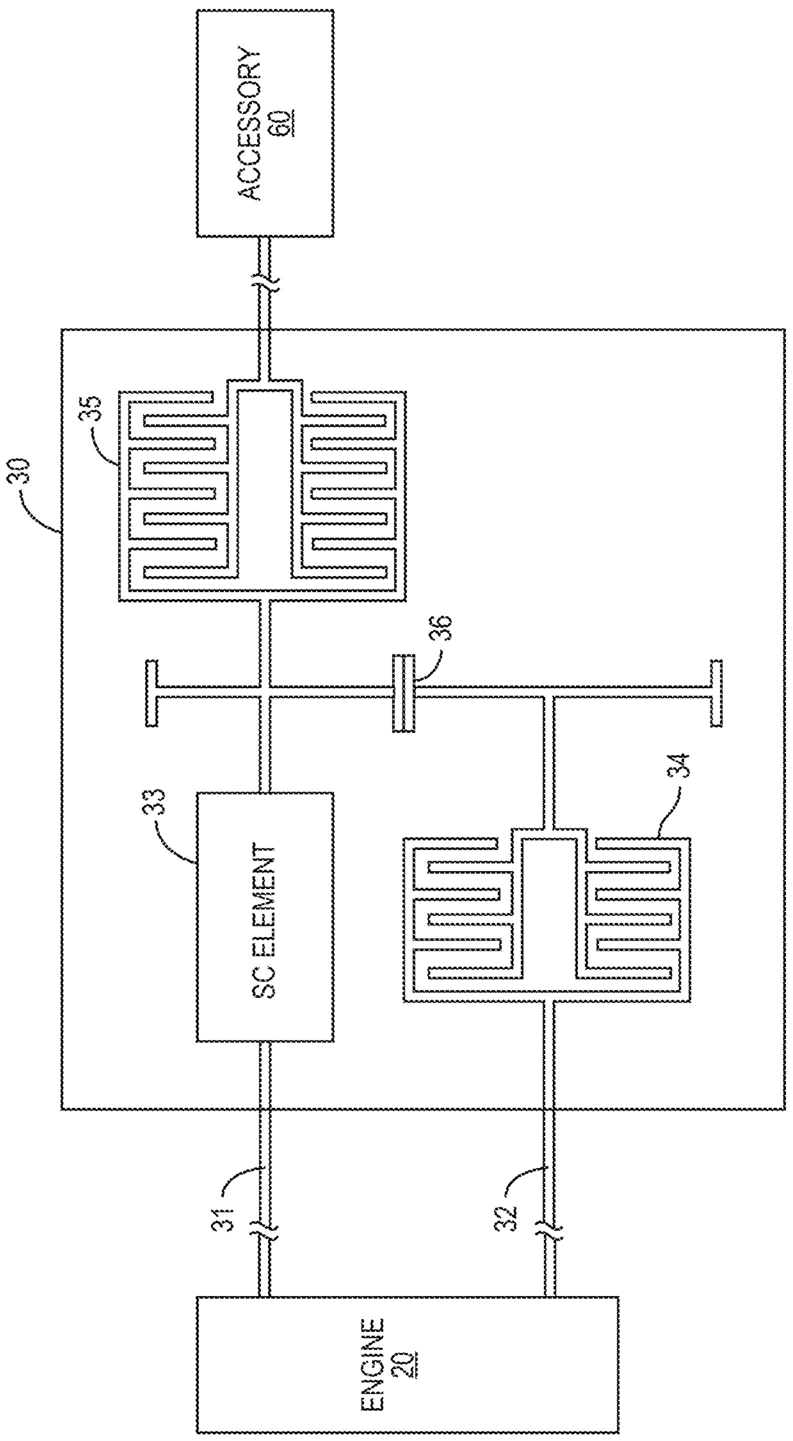
FIG. 4 is a schematic diagram of a transmission.

In some examples as illustrated in FIG. 4, the transmission 30 includes a speed changing element 33, a power transfer clutch 34, an accessory clutch 35, and a power transfer gearset 36. The power transfer clutch 34 and the compressor clutch 35 can include various configurations. Examples include but are not limited to a friction clutch, a one-way clutch (e.g., sprag clutch), a positive engagement coupling (e.g., Curvic or spline coupling), a fluid coupling, and a torque converter. The gearset 36 provides for transferring power between the drive mechanisms 31, 32 connected respectively to the low pressure spool 75 and the high pressure spool 85. In some examples, the transmission 30 includes a continuously variable transmission. In other examples, the transmission 30 includes different configurations such as but not limited to a constant speed transmission, a speed changing transmission with a torque converter, and an electrically based motor/generator continuously variable transmission.

The transmission 30 operates in one of three configurations. A first configuration provides power to the accessory 60. A second configuration provides for transferring power between the spools 75, 85. A third configuration provides for neither powering the accessory 60 nor providing power transfer between the spools 75, 85.

Figure 5:
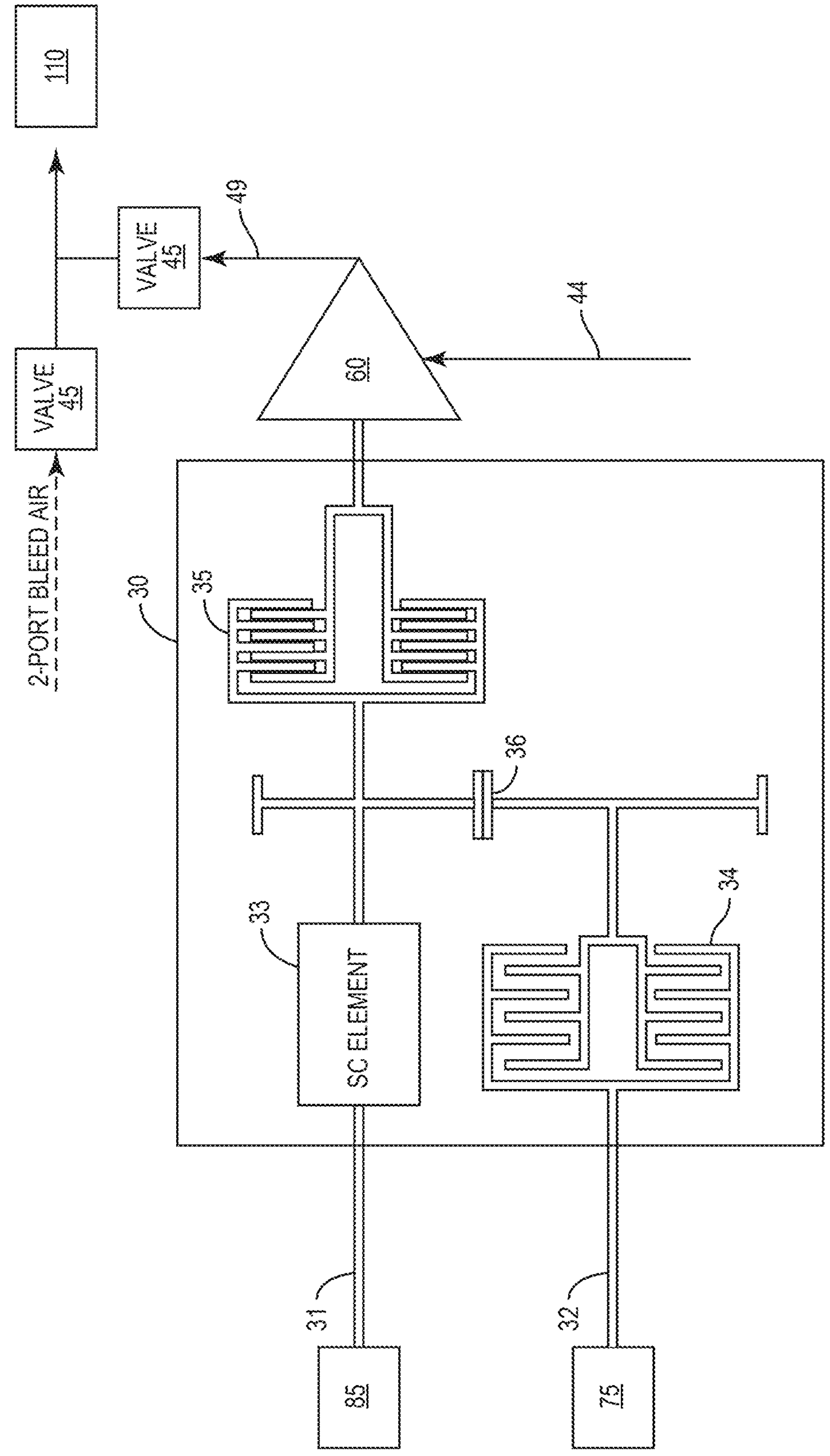
FIG. 5 is a schematic diagram of the transmission of FIG. 4 in a configuration to provide power to a compressor.

FIG. 5 illustrates one example in which the transmission 30 is in the first configuration for powering a compressor 60. In this configuration, the power transfer clutch 34 is disengaged and the compressor clutch 35 is engaged. Power from the high pressure spool 85 is transferred through the speed changing element 33 and engaged compressor clutch 35 to power the compressor 60 to provide air to the aircraft system 110. In some examples, the first configuration occurs when the bleed air system 40 is not supplying air to the aircraft system 110.

Figure 6:
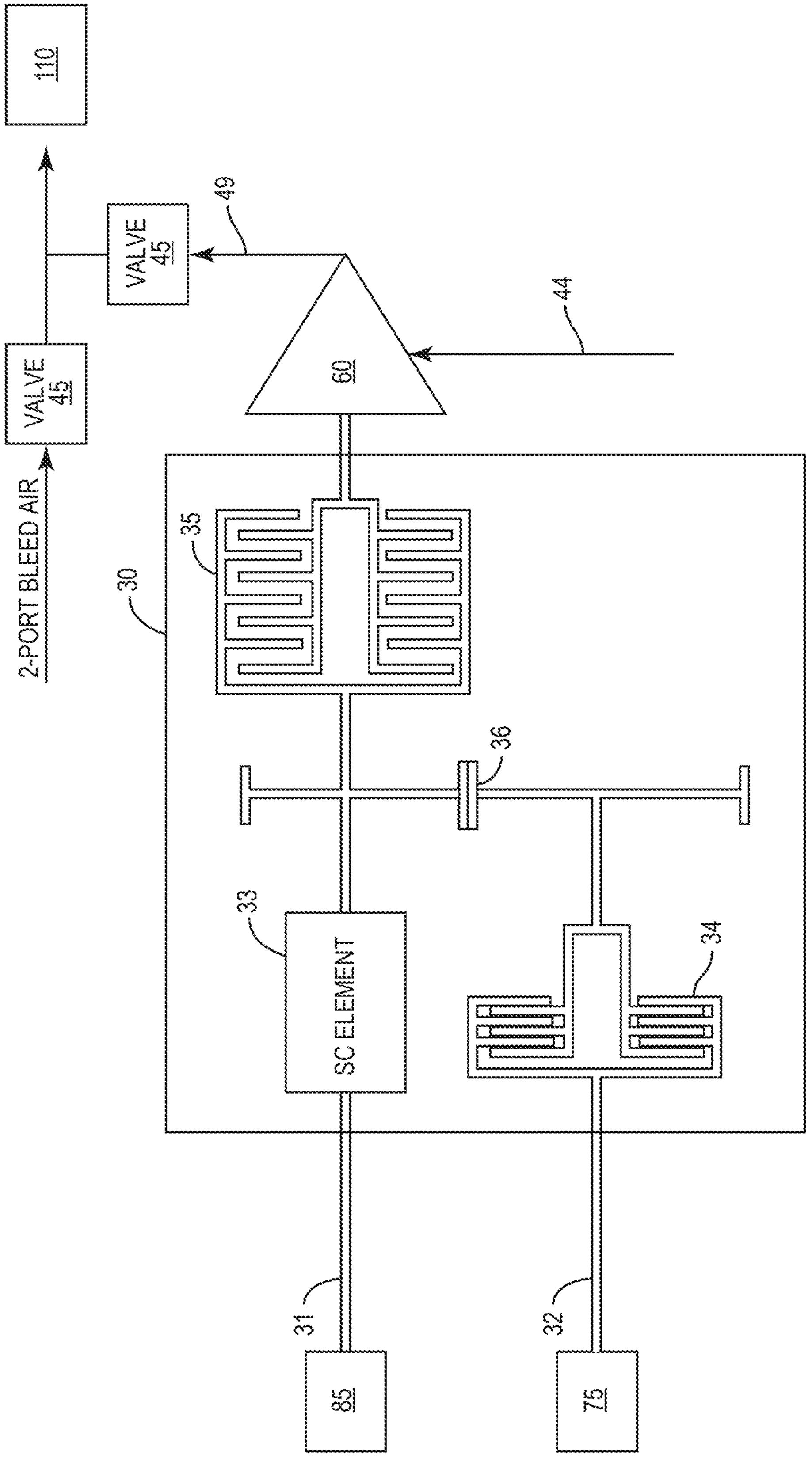
FIG. 6 is a schematic diagram of the transmission in FIG. 4 in a configuration to transfer power in the turbine engine.

FIG. 6 illustrates an example of the second configuration that transfers power between the spools 75, 85. The power transfer clutch 34 is engaged and the compressor clutch 35 disengaged. Power from the low pressure spool 75 is transferred to the high pressure spool 85. In this configuration, the bleed air system 40 is providing air to aircraft system 110 as the compressor 60 is not being powered through the transmission 30. In some examples, this power transfer configuration occurs during steady state operation of the turbine engine 20, such as during a ground idle state. Additionally or alternatively, this configuration is used during a transient operation of the turbine engine 20, such as during a snap acceleration during flight.

Figure 7:
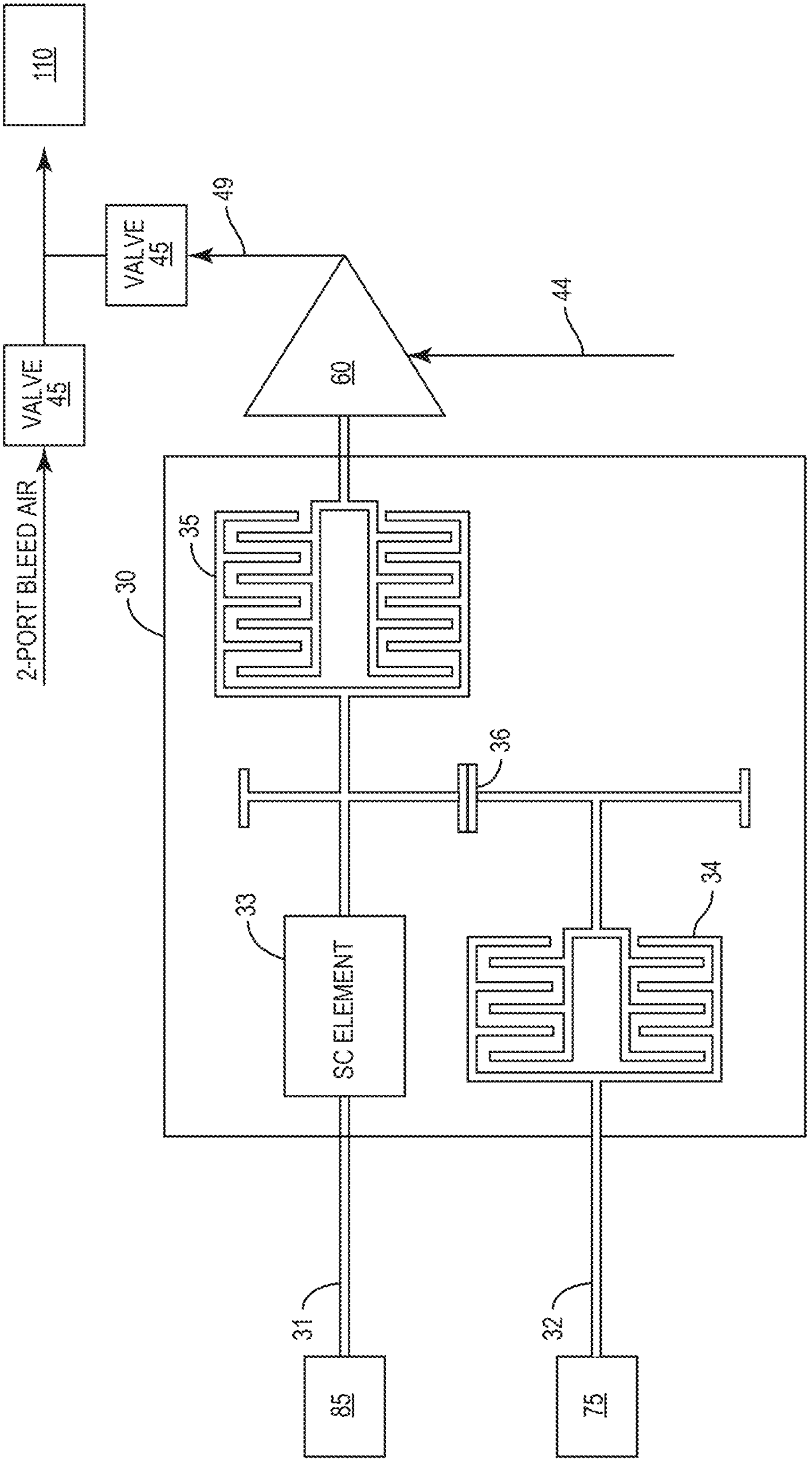
FIG. 7 is a schematic diagram of the transmission of FIG. 4 in a configuration that does not provide power to a compressor or transfer power in the turbine engine.

FIG. 7 illustrates an example of the third configuration. The transmission 30 includes both the power transfer clutch 34 and compressor clutch 35 disengaged and thus power is not being transferred to the compressor 60 and is not being transferred between the spools 75, 85. In some examples, this configuration occurs when the bleed air system 40 is providing air to the aircraft system 110. In one example, this occurs when the bleed air system 40 is supplying air that closely matches the prerequisite for the aircraft system 110.

Figure 8A:
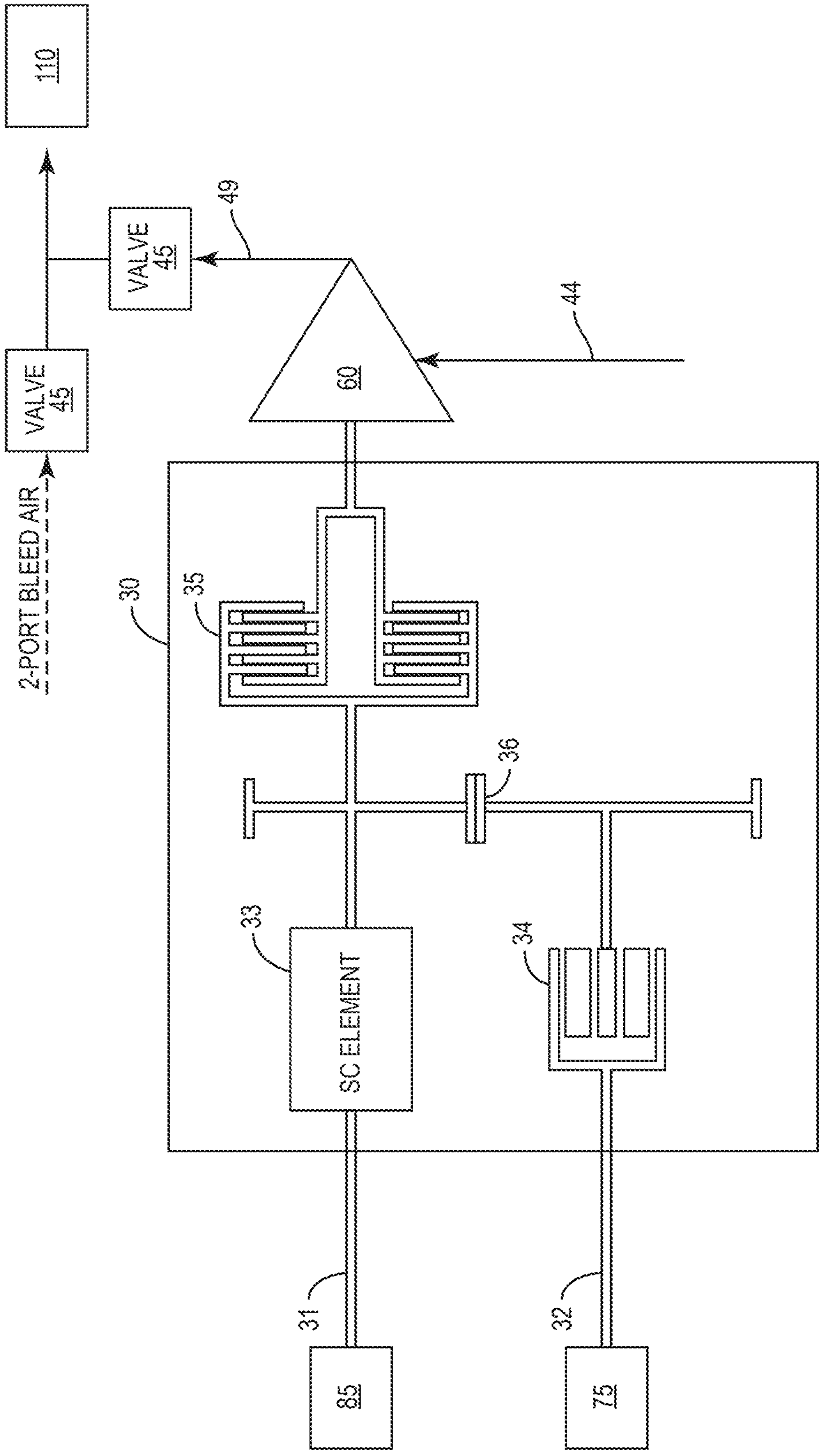
FIG. 8A is a schematic diagram of a transmission in a configuration to power a compressor.
Figure 8B:
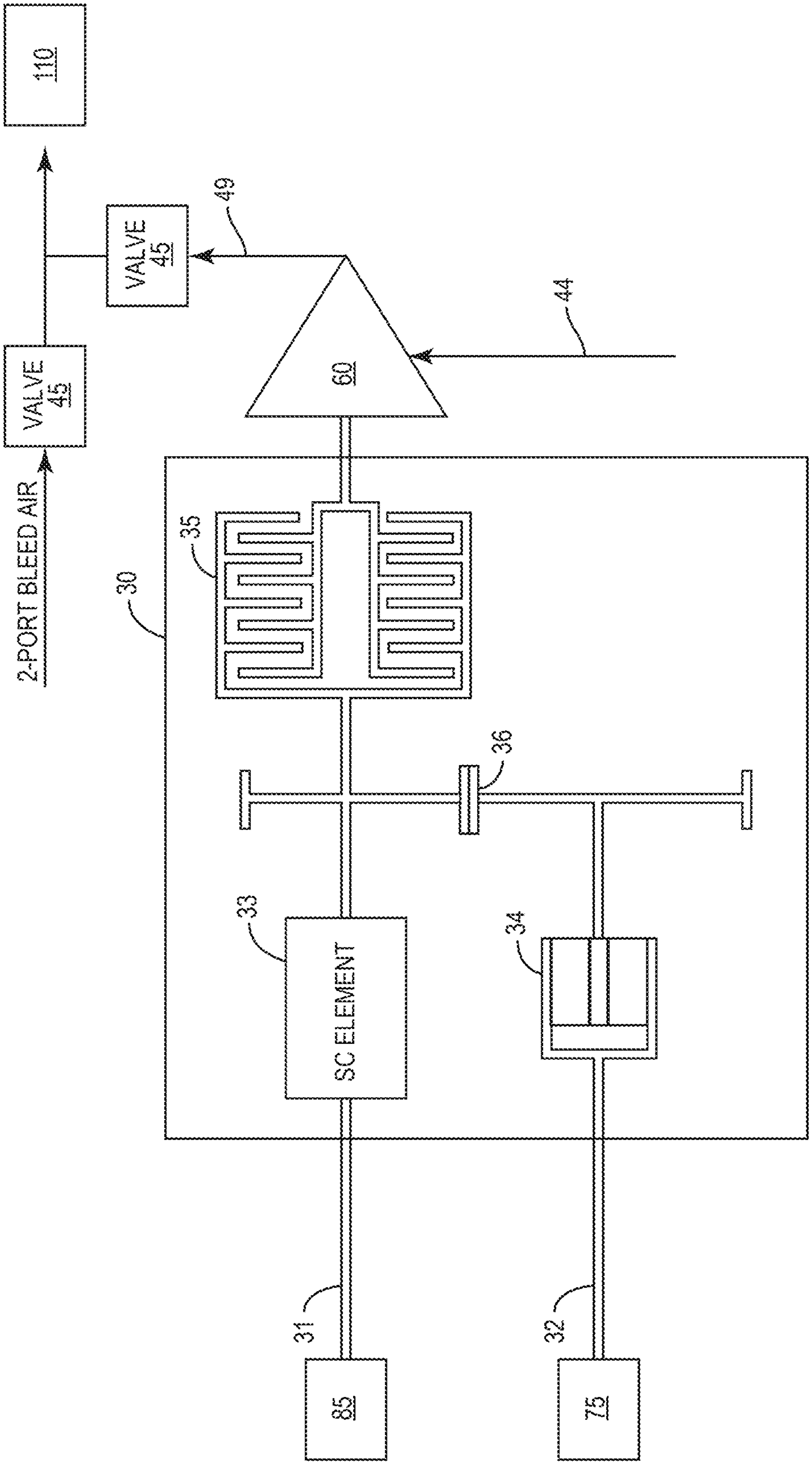
FIG. 8B is a schematic diagram of the transmission in FIG. 8A in a configuration to transfer power in the turbine engine.

In some examples as illustrated in FIGS. 8A and 8B, the power transfer clutch 34 is a sprag clutch or includes another one-way clutch mechanism. The sprag clutch is lighter and less complex than a friction clutch. In some examples that use a sprag clutch, a larger operating ratio is necessary for the speed changing element 33 to keep the sprag clutch from overrunning when the transmission 30 is configured to power the compressor 60. The larger operating ratio also provides for the sprag clutch to remain engaged when the transmission 30 is configured to transfer power between the spools 75, 85. FIG. 8A includes the compressor clutch 35 engaged and the transmission 30 powering the compressor 60. The high operating ratio on the speed changing element 33 prevents the sprag clutch from overrunning. FIG. 8B illustrates the transmission 30 configured for power transfer between the spools 75, 85 and the sprag clutch 34 engaged with the low operating ratio of the speed changing element 33 providing for the sprag clutch 34 to remain engaged. Air is being provided by the bleed air system 40 to the aircraft system 110.

In some examples, the sprag clutch 34 includes a sprag clutch 178, a sprag clutch input shaft, and a sprag clutch output shaft. The sprag clutch 34 can also include speed sensors such as speed pickups mounted to the input and output shafts and/or encoders mounted directly on the shafts. The measurements of the speed sensors are output to a controller 120 that oversees the operation of the transmission 30.

Figure 9A:
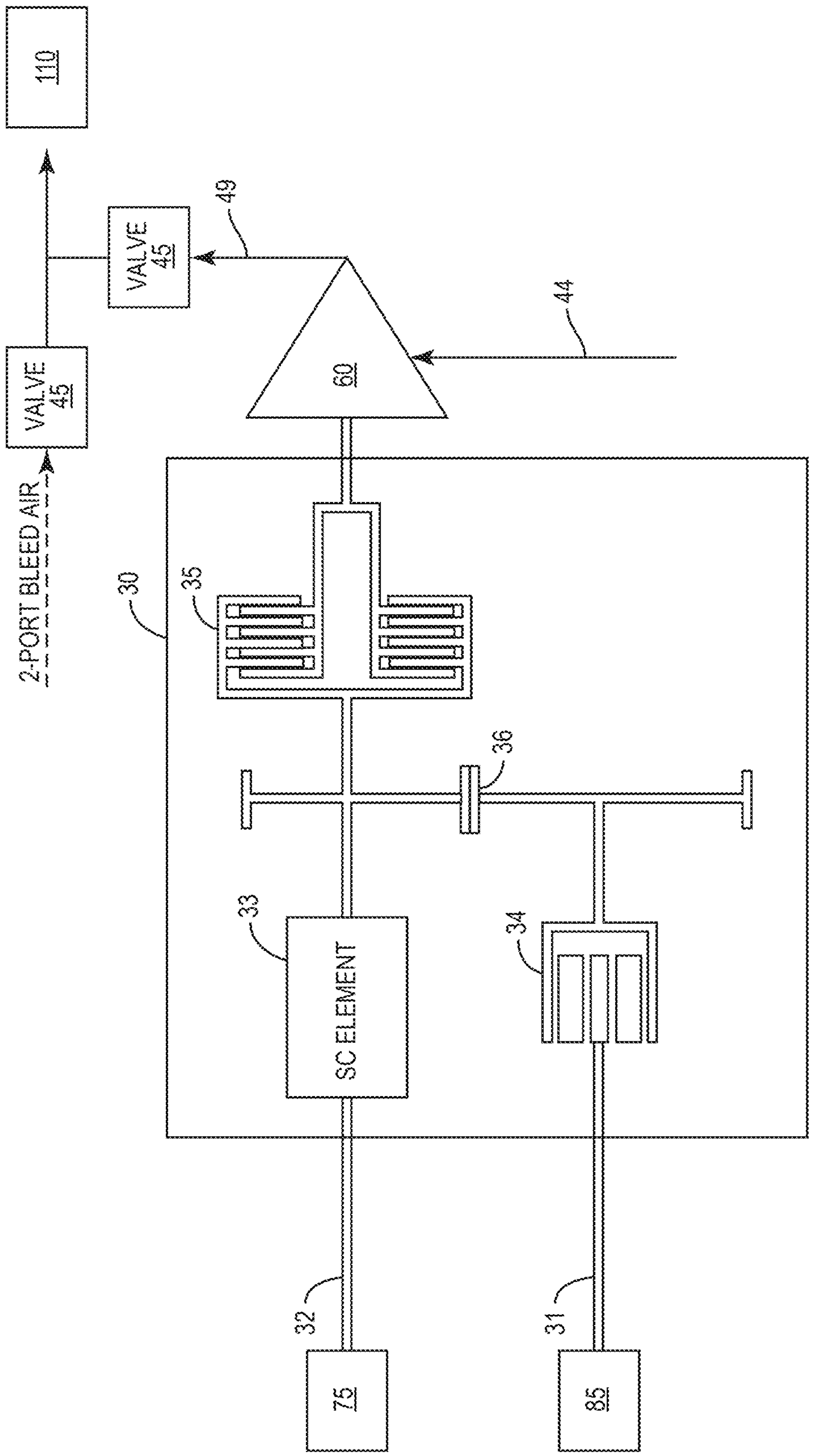
FIG. 9A is a schematic diagram of a transmission in a configuration to power a compressor.

In some examples as disclosed above (e.g., FIG. 8), the high pressure spool 85 drives the speed changing element 33 and the low pressure spool 75 drives the power transfer clutch 34. In some examples, this configuration is reversed. In some examples, reversing these inputs optimizes the operating speed bands of the spools 75, 85 and reduces the speed range of the speed changing element 33 that is required to keep a sprag clutch of the power transfer clutch 34 from overrunning during operation of the compressor 60. FIG. 9A illustrates the transmission 30 configured with the compressor clutch 35 engaged for the transmission 30 to provide power from the low spool 75 to the compressor 60. In this configuration, the compressor 60 provides air to the aircraft system 110 and the speed changing element 33 has a high operating ratio to prevent the sprag clutch 34 from overrunning. In some examples, air is not being provided by the bleed air system 40.

Figure 9B:
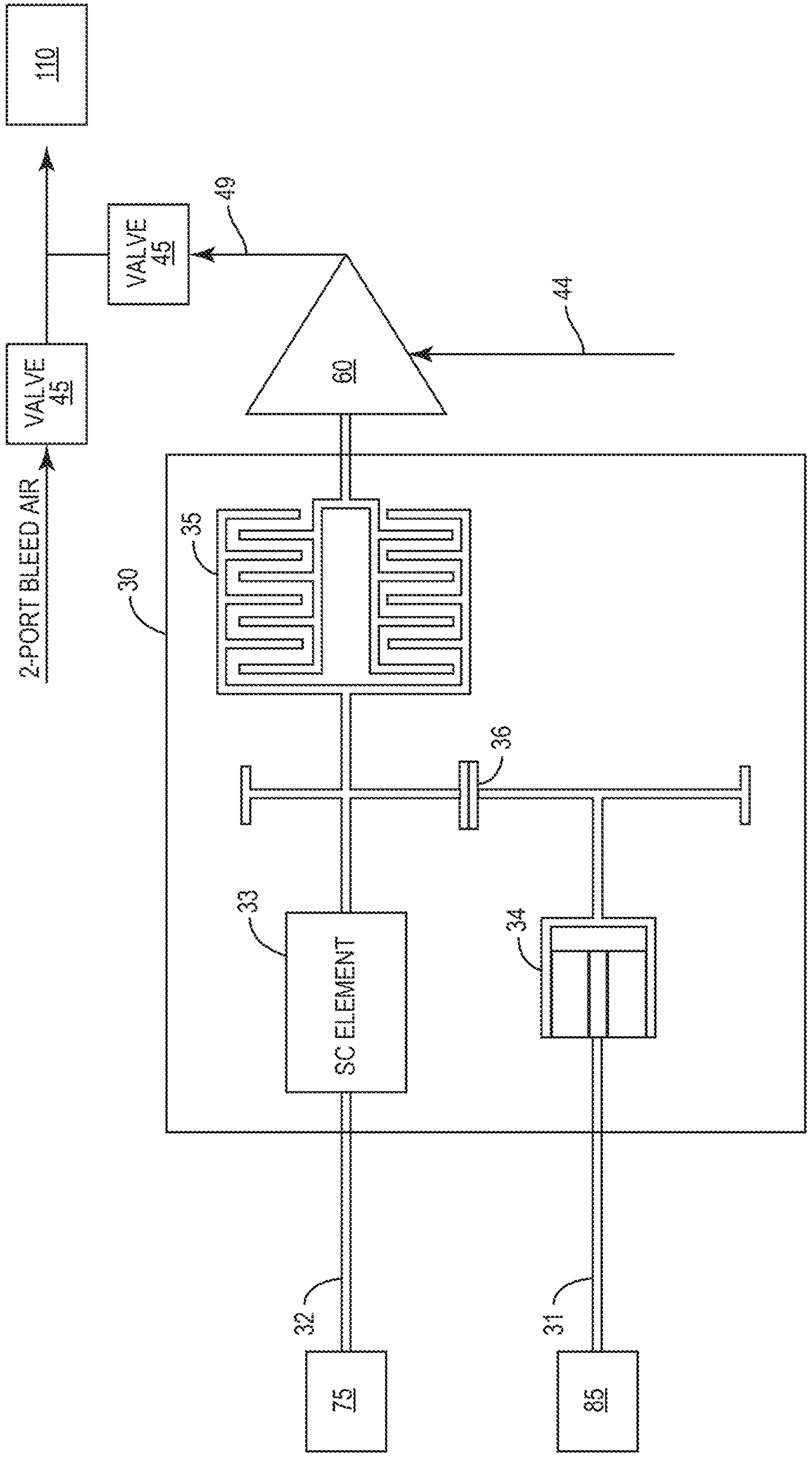
FIG. 9B is a schematic diagram of the transmission in FIG. 9A in a configuration to transfer power in the turbine engine.

FIG. 9B illustrates a power transfer configuration for the transmission 30 with the power transfer clutch 34 (which in this example is a sprag clutch) engaged to transfer power between the spools 75, 85. In some examples, the speed changing element 33 has a low operating ratio to keep the sprag clutch engaged. In some examples, the bleed air system 40 provides air to the aircraft system 110 in this configuration.

Figure 10A:
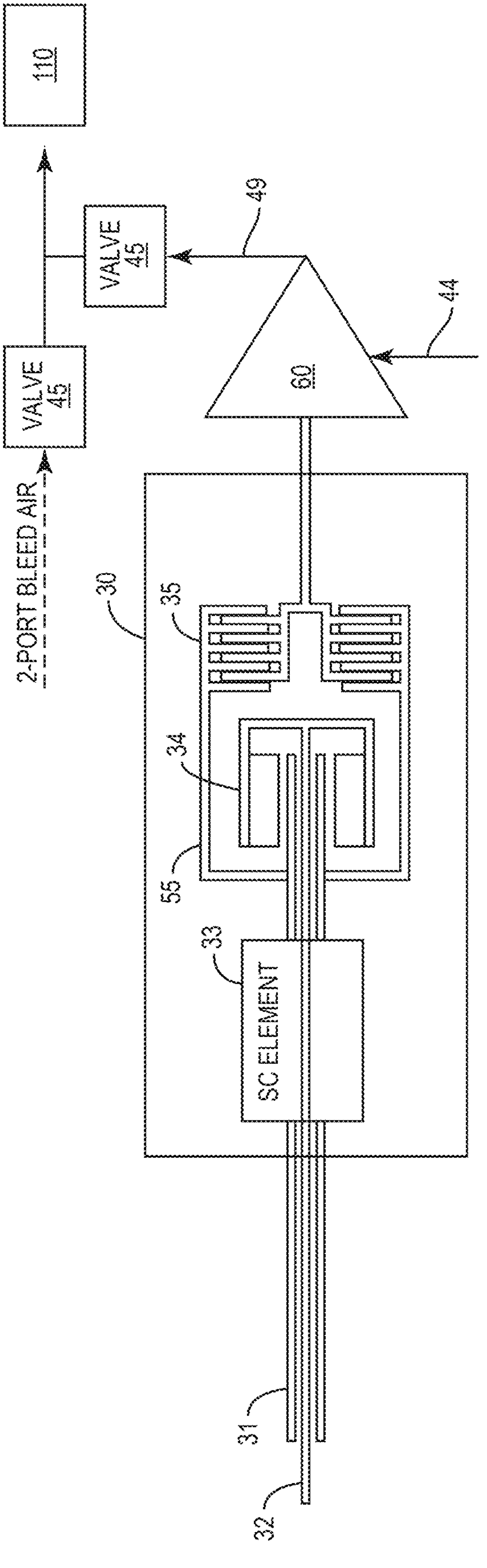
FIG. 10A is a schematic diagram of a transmission in a configuration to power a compressor.
Figure 10B:
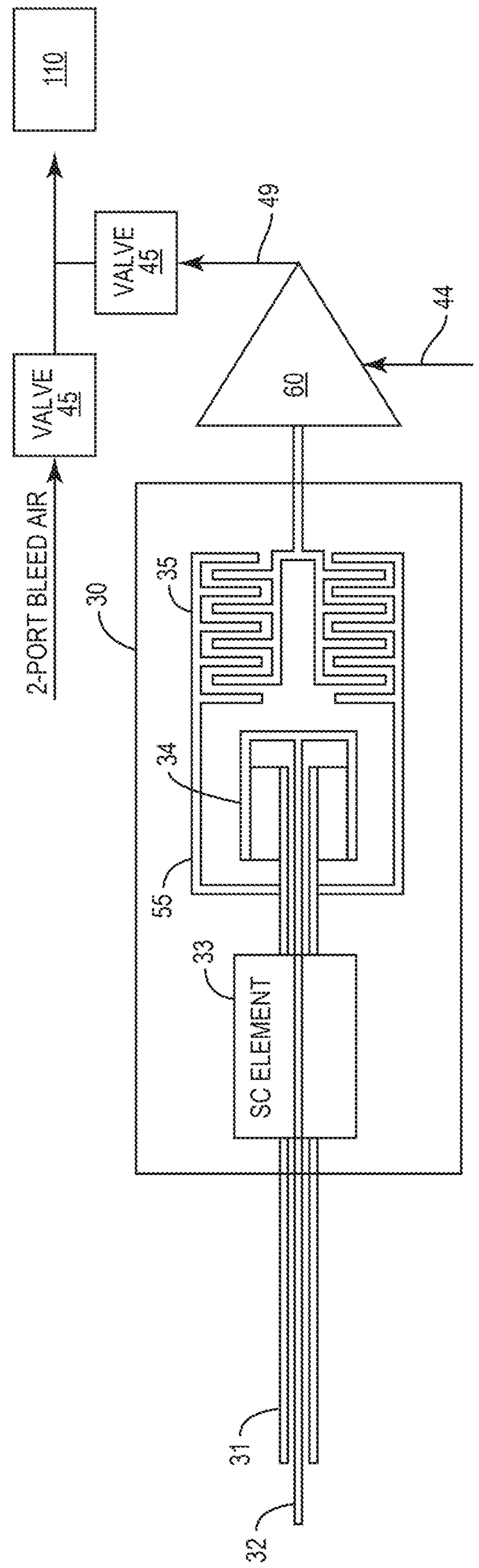
FIG. 10B is a schematic diagram of the transmission in FIG. 10A in a configuration to transfer power in the turbine engine.

In some examples disclosed above, the drive mechanisms 31, 32 that transfer power from the spools 75, 85 to the transmission 30 are separate and spaced apart. In other examples, the drive mechanisms 31, 32 are combined into a single unit which improves packaging, eliminates parts, and reduces the size envelope. FIGS. 10A and 10B illustrate an example in which the drive mechanisms 31, 32 are concentric. In this example, drive mechanism 32 is positioned within the interior of drive mechanism 31. Other examples can include a reverse configuration.

As illustrated, the power transfer clutch 34 and the compressor clutch 35 are mounted together within a single housing 55. The power transfer clutch 34 and the compressor clutch 35 are further mounted on concentric shafts to reduce the volume of the transmission 30. In one example, the power transfer clutch 34 is a sprag clutch, although other types of mechanisms can also be used. FIG. 10A illustrates a configuration with the compressor clutch 35 engaged to power the compressor 60 and provide air to the aircraft system 110. In some examples, the bleed air system 40 does not provide air in this configuration.

FIG. 10B illustrates a power transfer configuration with the power transfer clutch 34 engaged and the compressor clutch 35 disengaged. This provides for power transfer from the low spool 75 to the higher spool 85. In some examples in which the power transfer clutch 34 is a sprag clutch, the speed changing element 33 has a high operating ratio to prevent overrunning when powering the compressor 60 (FIG. 10A) and a low ratio during power transfer (FIG. 9B) to maintain engagement of the sprag clutch.

Figure 11A:
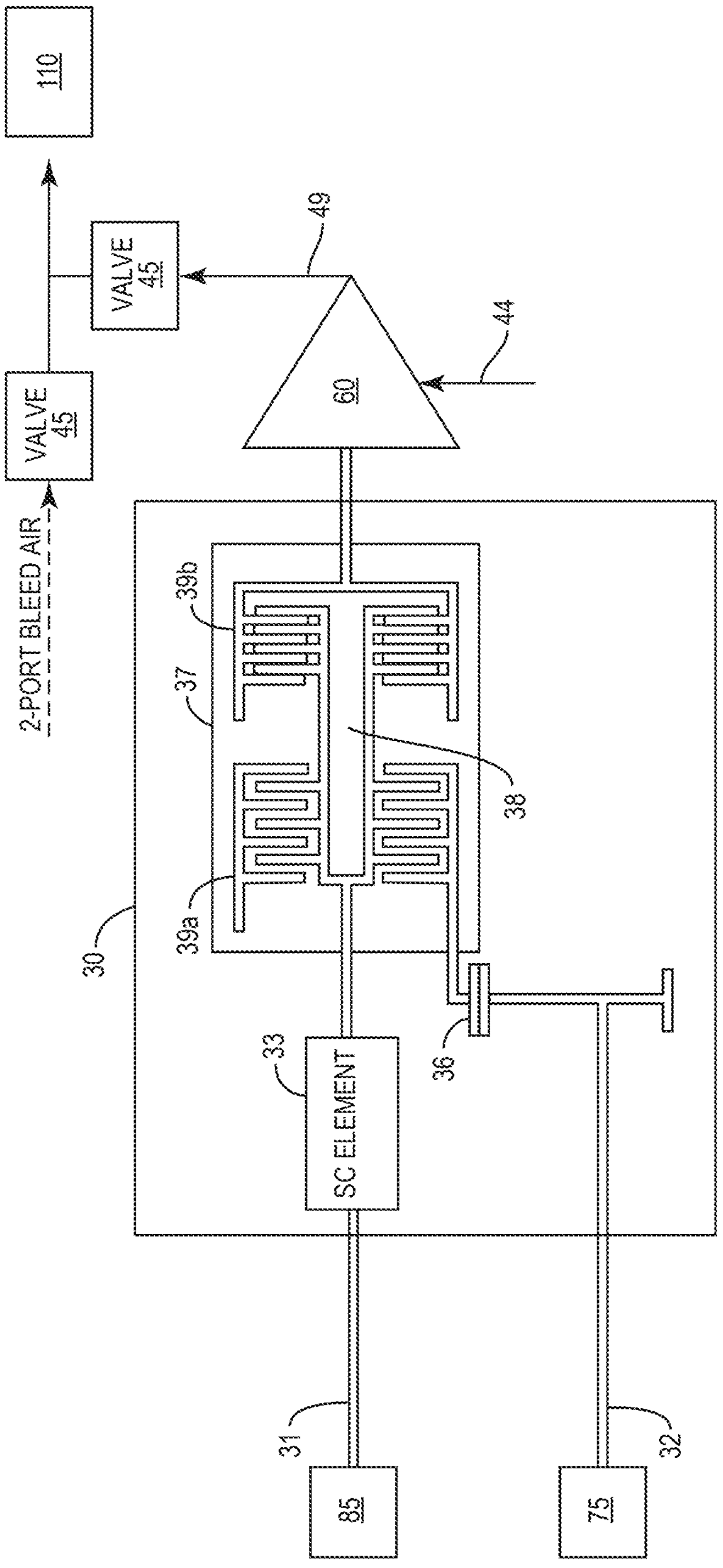
FIG. 11A is a schematic diagram of a transmission in a configuration to power a compressor.
Figure 11B:
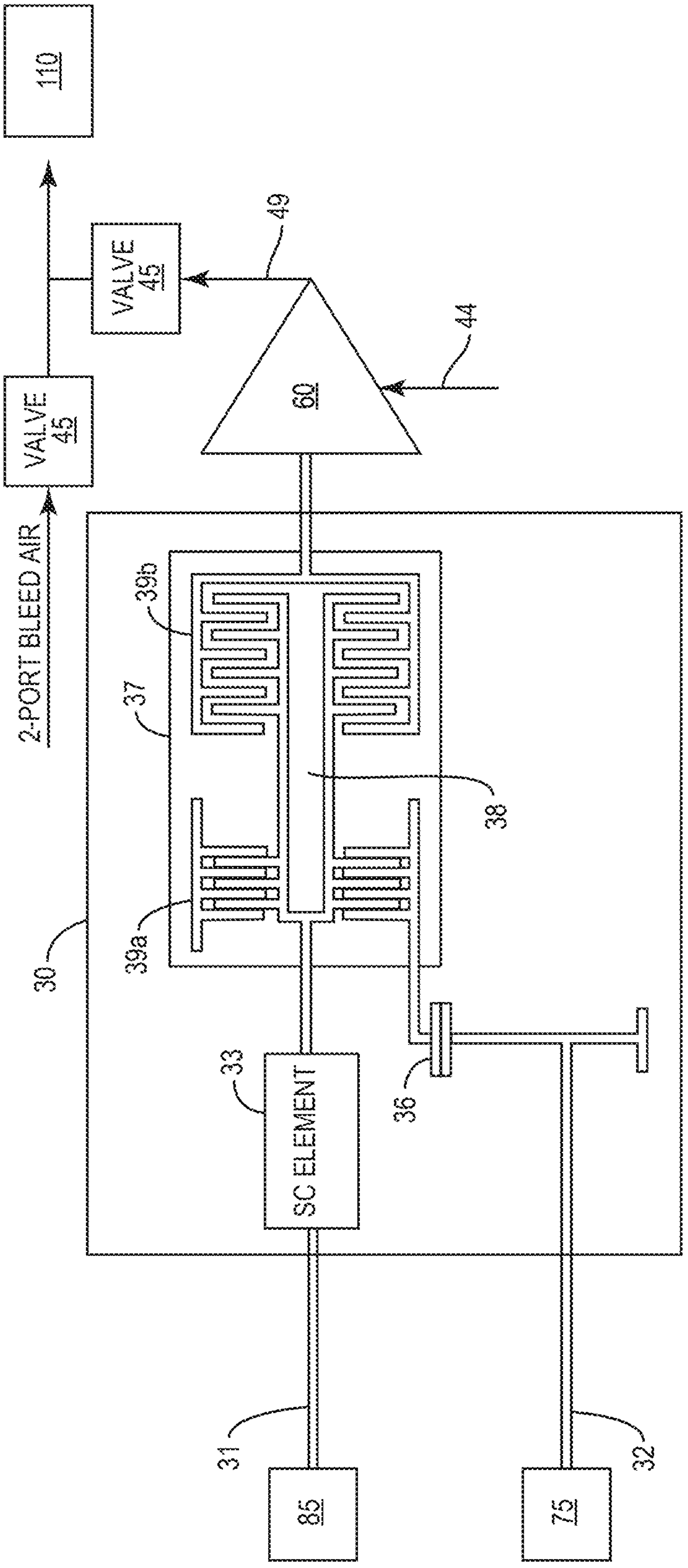
FIG. 11B is a schematic diagram of the transmission in FIG. 11A in a configuration to transfer power in the turbine engine.

In some examples as illustrated in FIGS. 11A and 11B, the transmission 30 includes a dual output friction clutch 37. The dual output friction clutch 37 merges the functionality of the power transfer clutch 34 and the compressor clutch 35 into a single component. The dual output friction clutch 37 reduces weight and envelope size relative to the two-component approach (that includes the power transfer clutch 34 and compressor clutch 35 being separate). The dual action friction clutch 37 includes a hydraulic piston 38 configured to engage with clutch plates 39*a*, 39*b*. FIG. 11A illustrates a configuration that powers the compressor 60 with the piston 38 engaging the clutch plates 39*b* that function to provide power to the compressor 60. FIG. 11B illustrates a configuration to transfer power from the spool 75 to spool 85. Piston 38 engages clutch plates 39*a* such that the dual output friction clutch 37 provides for the power transfer without powering the compressor 60.

Figure 12A:
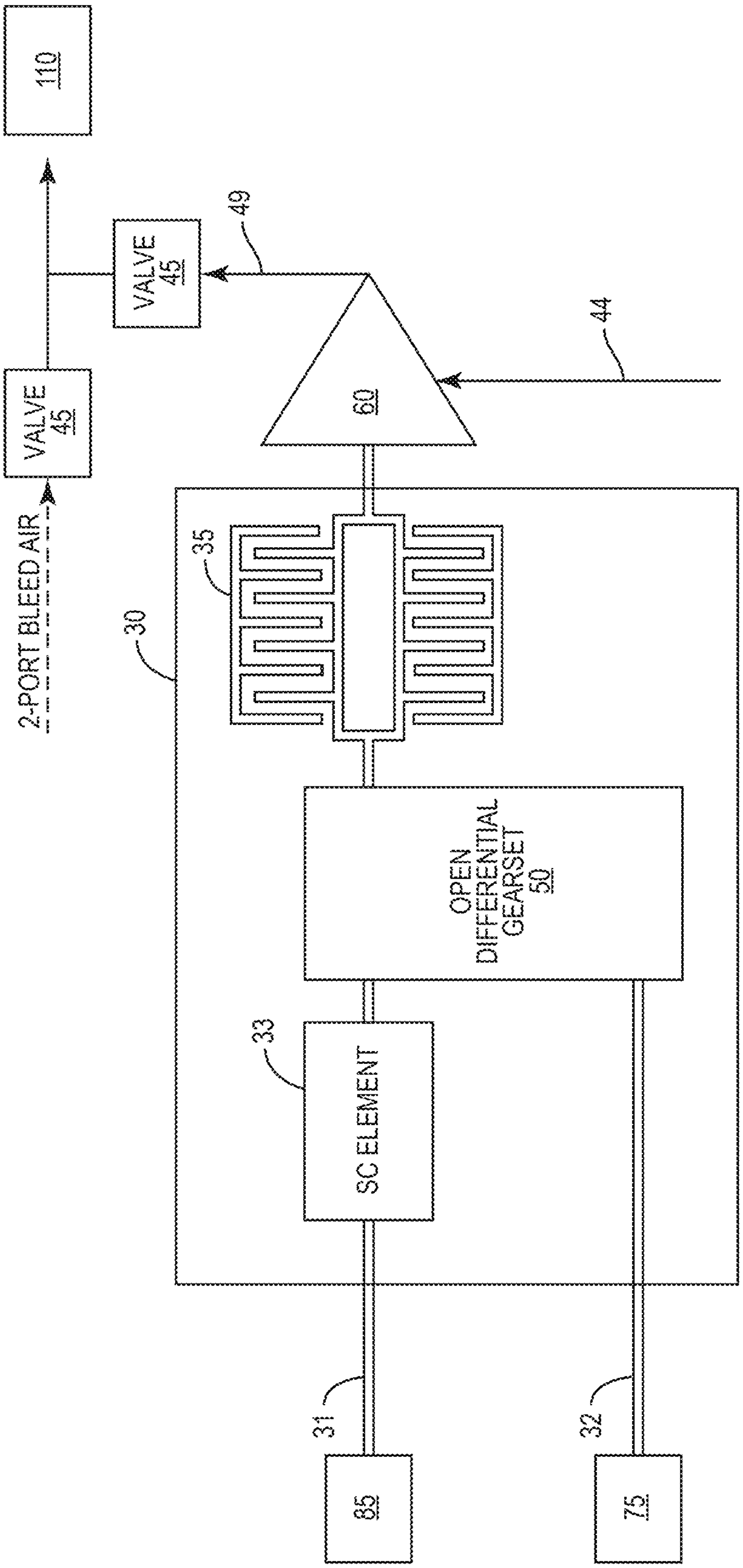
FIG. 12A is a schematic diagram of a transmission in a configuration to power a compressor.
Figure 12B:
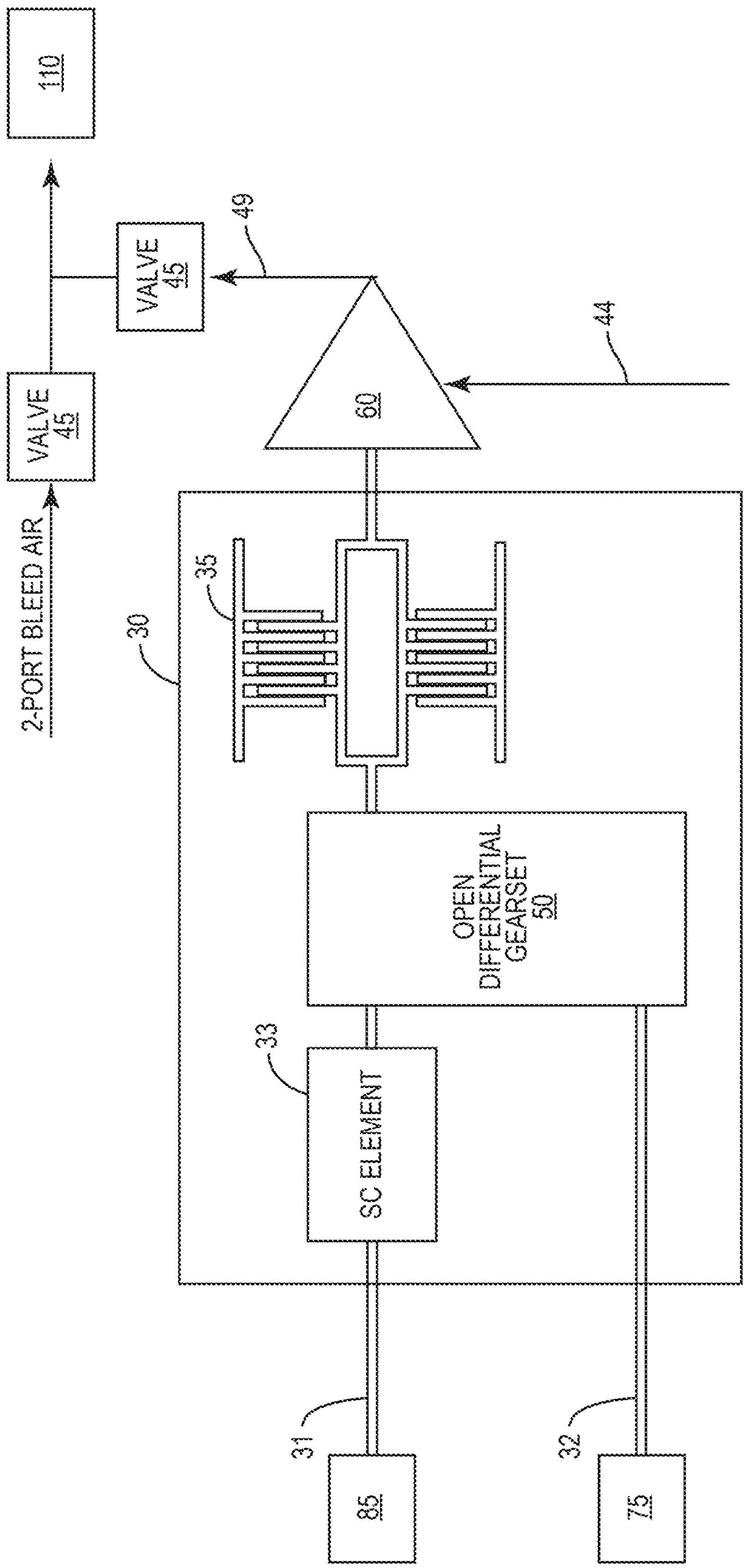
FIG. 12B is a schematic diagram of the transmission in FIG. 12A in a configuration to transfer power in the turbine engine.

In some examples as illustrated in FIGS. 12A and 12B, the transmission 30 includes an open differential gearset 50 that is installed between the drive mechanisms 31, 32. This transmission 30 does not include a power transfer clutch 34. FIG. 12A includes a first operational configuration that provides power to the compressor 60. In this configuration, the compressor clutch 35 is disengaged and the spools 75, 85 through the drive mechanisms 31, 32 drive the compressor 60. In some examples, the differential input speeds of the spools 75, 85 equals the driving speed of the compressor 60 (i.e., speed of 32+speed of 31=compressor speed). FIG. 12B illustrates the transmission 30 in a power transfer mode. The compressor clutch 35 is engaged which locks the compressor 60. Further, the gearset 50 couples the drive mechanisms 31, 32. In this configuration, the compressor clutch 35 becomes a braking clutch which simplifies and reduces weight and size.

Figure 13A:
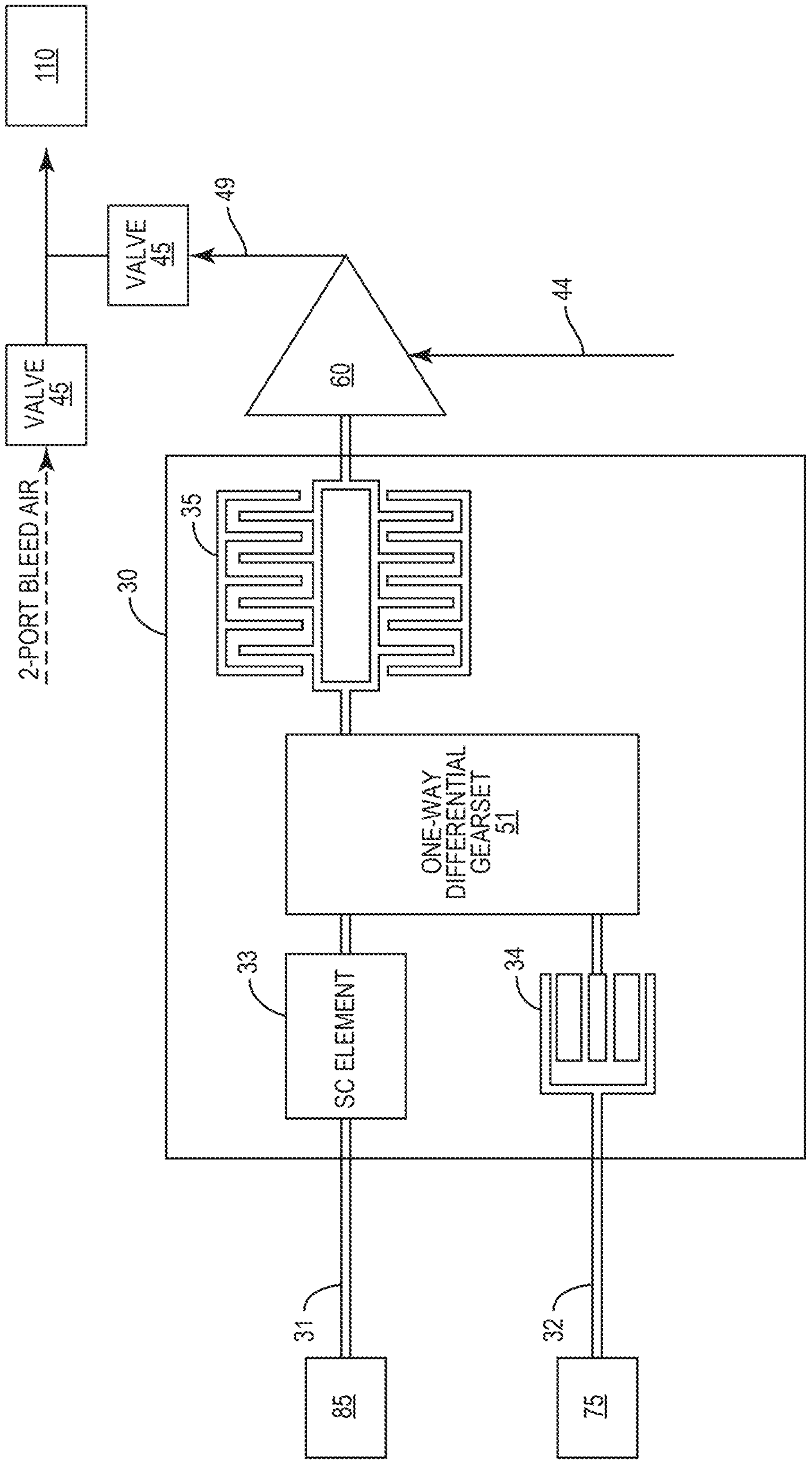
FIG. 13A is a schematic diagram of a transmission in a configuration to power a compressor.
Figure 13B:
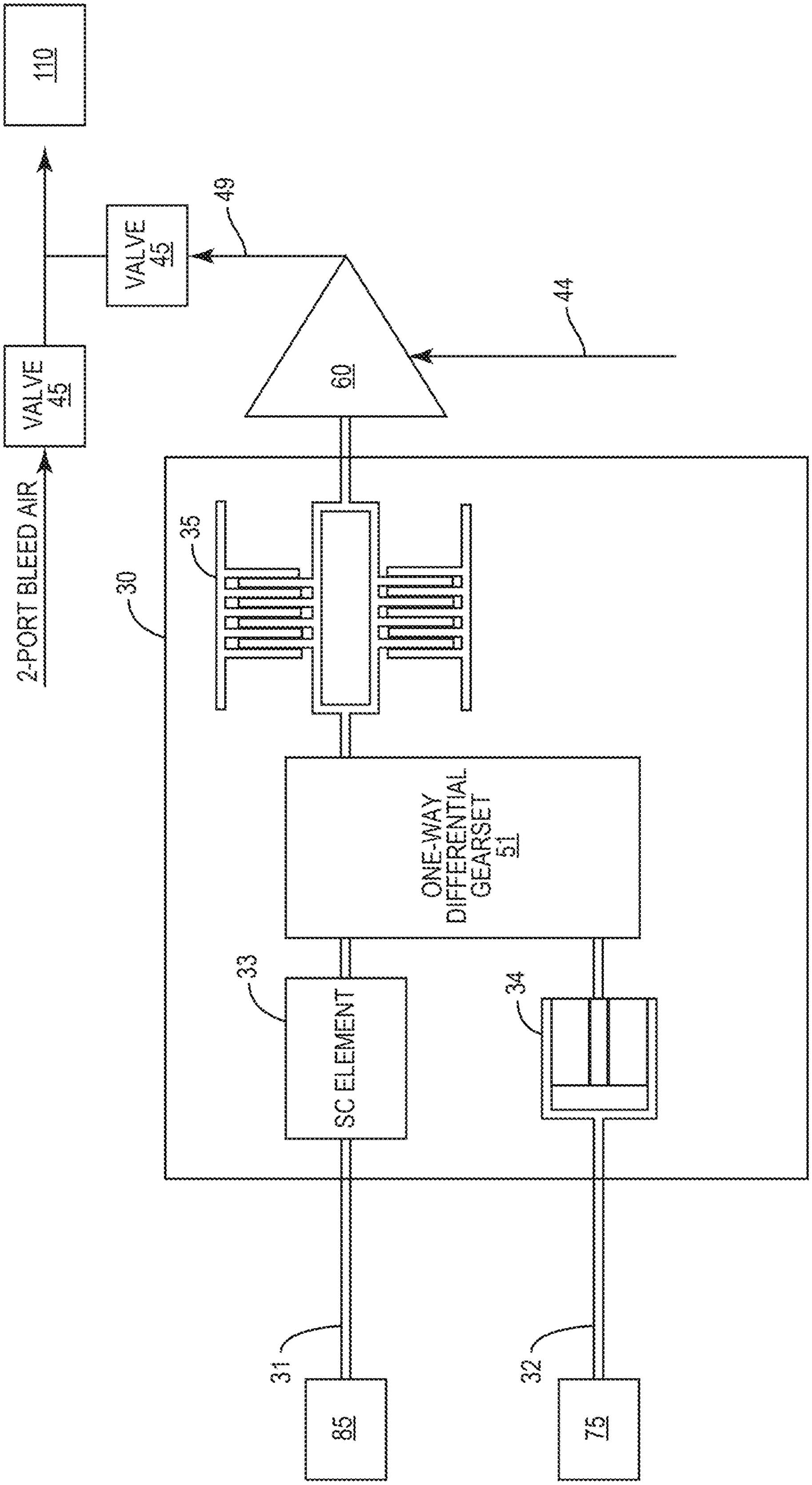
FIG. 13B is a schematic diagram of the transmission in FIG. 13A in a configuration to transfer power in the turbine engine.

FIGS. 13A and 13B include an example with the transmission 30 having a one-way differential gearset 51 and a power transfer clutch 34 which in this example is a sprag clutch. The one-way differential gearset 51 and the sprag clutch on the spool 75 avoids sharing drive power between the spools 75, 85 during a configuration that powers the compressor 60. This is accomplished by braking the compressor 60 which couples the spools 75, 85 together via the one-way differential gearset 51 and the sprag clutch. This arrangement provides for a reduced speed range relative to an open differential design.

FIG. 13A includes the transmission 30 in a first configuration the provides power to the compressor 60. In this configuration, the compressor 60 is being driven by just spool 85 as the sprag clutch is overrunning. FIG. 13B includes a power transfer configuration with the compressor clutch 35 engaged to lock the compressor 60. In this configuration, locking the compressor 60 creates a different ratio through the differential which engages the sprag clutch 34 thus providing for power transfer between the spools 75, 85.

A controller 120 controls the operation of the transmission 30. The controller 120 executes instructions to engage one or more of the components of the transmission 30 (e.g., speed changing element 33, power transfer clutch 34, compressor clutch 35) to selectively provide for operation of the compressor 60 and power transfer. The controller 120 operates based on a number of factors including one or any combination of a ground speed of the aircraft 100, weight on wheels of the aircraft 100 (e.g., indicating that the aircraft 100 has landed), or during different stages of operation of the aircraft 100. Example stages of operation of the aircraft 100 that can trigger operation of the transmission 30 include ground idle operation of the aircraft 100, when the aircraft 100 is taxiing, when the aircraft 100 enters takeoff mode, during descent of the aircraft 100, or during flight of the aircraft 100 to assist with restart of another turbine engine 20. In some examples, the controller 120 receives signals from one or more other systems on the aircraft 100 (e.g., flight controller) to determine the factors.

Figure 14:
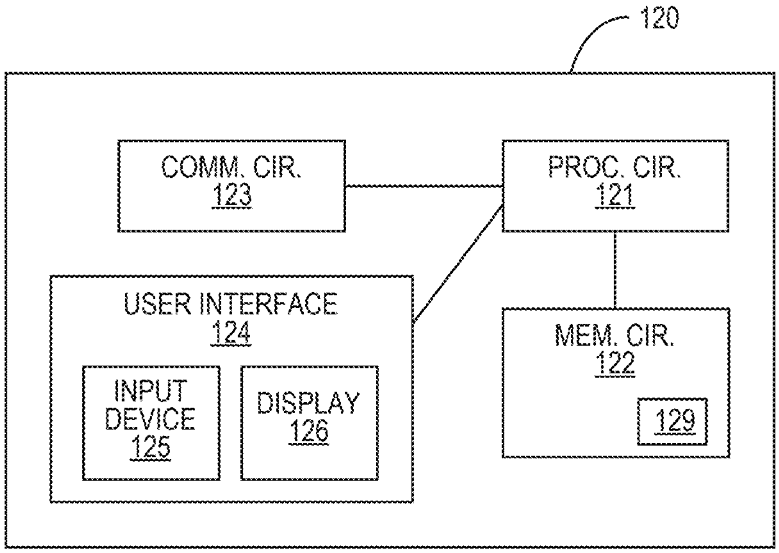
FIG. 14 is a schematic diagram of a controller.

FIG. 14 illustrates a controller 120 that operates the transmission 30. The controller 120 is a computing device that includes processing circuitry 121 that controls the operation of the transmission 30 according to program instructions 129 stored in memory circuitry 122. The processing circuitry 121 includes one or more circuits, microcontrollers, microprocessors, hardware, or a combination thereof. Memory circuitry 122 includes a non-transitory computer readable storage medium storing the program instructions 129 that configures the processing circuitry 121 to implement one or more of the techniques discussed herein. Memory circuitry 122 can include various memory devices such as, for example, read-only memory, and flash memory. Memory circuitry 122 can be a separate component as illustrated in FIG. 12 or can be incorporated with the processing circuitry 121.

Communication circuitry 123 provides for communications with one or more of the components including but not limited to components of the transmission 30, compressor 60, turbine engine 20, and bleed air system 40. The communication circuitry 123 is configured for communication via one or more wired and/or wireless communication links. In some examples, the communication circuitry 123 is configured for communication with one or more remote nodes that are located away from the aircraft 100.

A user interface 124 provides for a person such as pilot or flight crew member to monitor and/or control one or more aspects of the transmission 30. In some examples, the user interface 124 is positioned on the flight deck for use during flight. The user interface 124 includes one or more input devices 125 such as but not limited to a keypad, touchpad, roller ball, and joystick that provide for entering commands to the processing circuitry 121. The user interface 124 can also include one or more displays 126 for displaying information.

Figure 15:
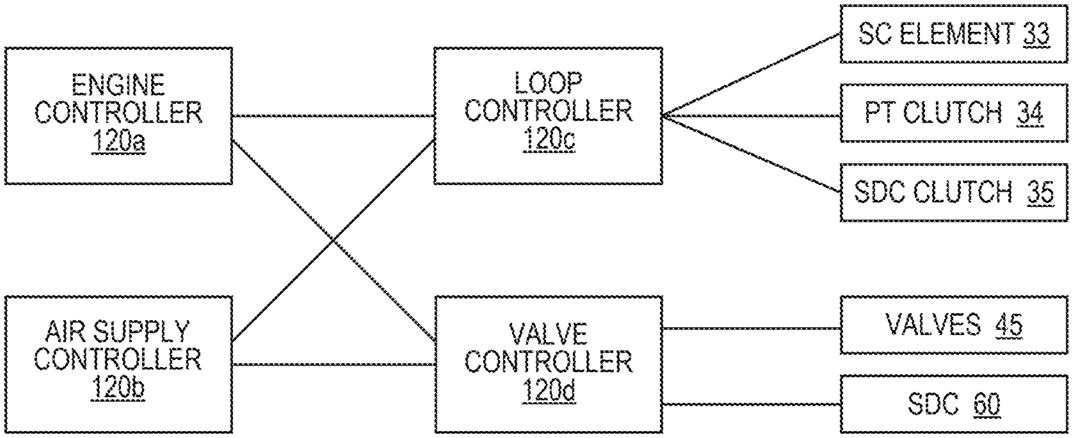
FIG. 15 is a schematic diagram of controllers configured to operate components to provide air to an aircraft system and transfer power within a turbine engine.

In some examples, a single dedicated controller 120 monitors and/or controls the operation of the transmission 30 to control the power transfer and air supply. In other examples, the operation occurs through two or more controllers 120. FIG. 15 illustrates a system with various levels of controllers 120, and with the accessory 60 being a compressor that can supply air to the aircraft system 110. The controllers 120 include a first level of controllers 120 including an engine controller 120*a* and an air supply controller 120*b*. A second level of controllers 120 includes a loop controller 120*c* and a valve controller 120*d*. In some examples, the higher level controllers function to control general aspects of the air control and power transfer. Lower level controllers function to control more specific aspects. In the example of FIG. 13, loop controller 120*c* controls the speed changing element 33, power transfer clutch 34, and compressor clutch 35. Valve controller 120*d* controls the valves 45 and compressor 60.

In some examples, operation of the transmission 30 to power the compressor 60 includes the air supply controller 120*b* commanding the desired speed ratios for the speed changing element 33. The air supply controller 120*b* also controls the valves 45 and compressor 60. In a power transfer configuration, the engine controller 120*a* controls the speed changing element 33 to command the desired speed ratios.

Figure 16:
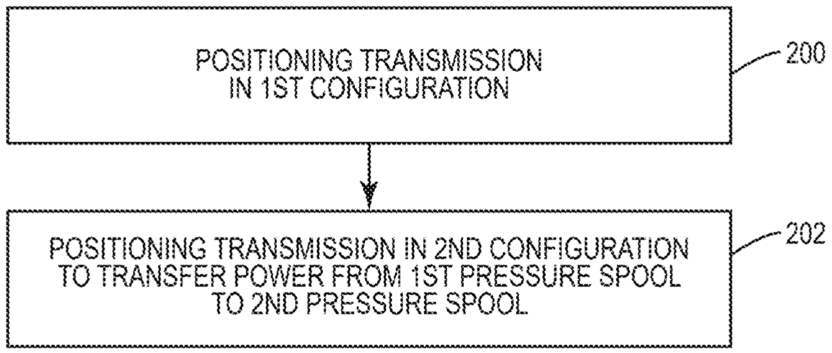
FIG. 16 is a flowchart diagram of a method of operating a transmission.

FIG. 16 illustrates a method of operating the transmission 30. The method includes positioning the transmission 30 in a first configuration (block 200). The first configuration provides for transferring power from the turbine engine 20 to an accessory 60. The method also includes positioning the transmission 30 in a second configuration (block 202). The second configuration transfers power from the first pressure spool 75 of the turbine engine 20 to the second pressure spool 85.

In one specific example in which the accessory 60 is a compressor, the method includes positioning the transmission 30 in a first configuration for transferring power from the turbine engine 20 to a compressor 60 to deliver air from the turbine engine 20 to an aircraft system 110. The method also includes positioning the transmission 30 in a second configuration for transferring power from a low pressure spool 75 of the turbine engine 20 to a high pressure spool 85.

In some examples, when the transmission 30 is configured to transfer power between the low pressure spool 75 and the high pressure spool 85 the compressors 60 is unavailable for use when power is being transferred between the spools 75, 85. In some examples, this is because the transmission ratio is not suitable to operate the compressor 60 when the power is being transferred between the spools 75, 85. However, the ability to transfer power between the spools 75, 85 is generally realized during ground idle and the two functionalities of the power transfer and the compressor 60 do not interfere with each other.

In some examples, the air bleed system 40 does not provide air to the aircraft system 110 when the compressor 60 is powered. In other examples, the air bleed system 40 and compressor 60 both concurrently supply air to the aircraft system 110. In some examples, the bleed air system 40 supplies air to the aircraft system without the compressor 60, such as during a ground idle.

In some examples, a gearbox that includes a drive train that has multiple gears is operatively connected to the drive mechanisms 31, 32 to set the speed.

Figure 17:
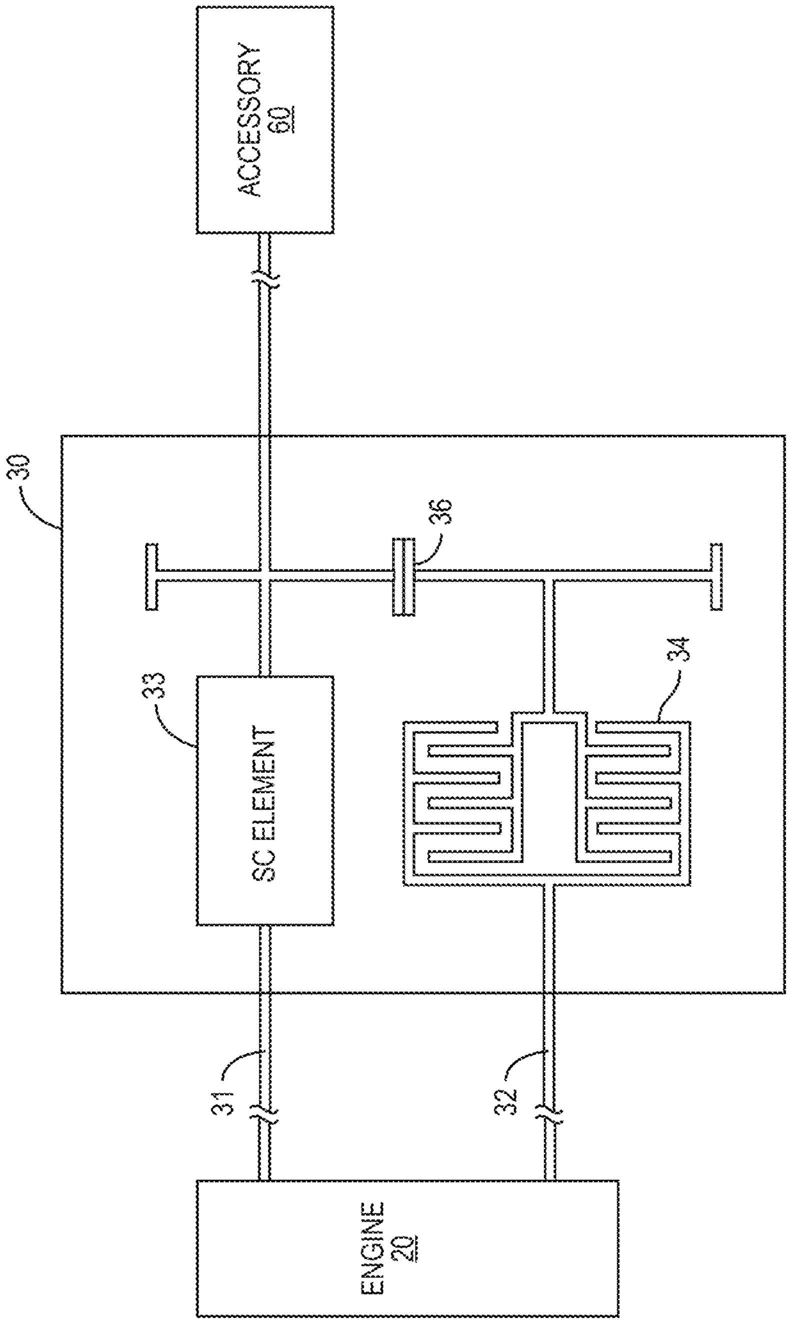
FIG. 17 is a schematic diagram of a transmission.

FIG. 17 illustrates a transmission 30 that includes a speed changing element 33, power transfer clutch 34, and a gearset 36. In this transmission 30, there is no accessory clutch 35. When in power transfer mode, the accessory 60 continues to spin and draw some power. An accessory surge bleed valve is open in the power transfer mode to reduce the power demand of the accessory 60.

In some examples as schematically shown, the transmission 30 is integrated into a single unit. In some specific examples, the transmission 30 is contained in a housing. In other examples, one or more of the components of the transmission are separate. For example, the speed changing element 33 is mounted separately from the power transfer clutch 34 and accessory clutch 35. The separate components can be mounted at various locations within the turbine engine 20 and/or other sections of the aircraft 100. One or more of the components can be integrated into other existing components. For example, the power transfer clutch 34 is installed onto drive mechanism 32.

In some examples, the system 15 beneficially enables a reduction in fuel consumption and engine thrust at idle conditions by transferring horsepower from the low pressure spool 75 to the high pressure spool 85. In so much that the taxi operation may require thrust above the idle level, the system 15 can stay engaged throughout the taxi operation, to prevent repeated operation of the clutch and to provide the power transfer at the above-idle thrust levels for the taxi operation. Examples have shown that using the system 15 can result in a significant idle fuel flow reduction.

The system 15 also beneficially enables precise control of the speed of the high pressure spool 85 (e.g., so as to meet electrical frequency requirements during a no break electrical power transfer). Use of the system 15 can be selectively controlled as well, such as disconnecting the clutch 34 at climb and cruise conditions where there is little to no benefit for power transfer to potentially avoid wear on the clutch 34 and/or the power transfer unit and to avoid the power losses from operating the system. The selective control can further be provided through manual pilot control of the system 15, and indication on a status of the power transfer can be provided in the flight deck 102.

In some examples, the system 15 can be used during in-flight idle (e.g., during decent), to reduce thrust and fuel flow.

Moreover, although the description generally describes that the transfer of power occurs via power produced by the low pressure spool 75 being transferred to the high pressure spool 85, the transfer of power can occur in the other direction, such as to transfer power produced from the high pressure spool 85 to the low pressure spool 75. Thus, the system 15 is bi-directional and can operate to transfer power in either direction. For example, there are instances where it may be advantageous to transfer power from the high pressure spool 85 to the low pressure spool 75. One instance occurs when there is a need to modulate a speed of the high pressure spool 85, such as when performing a no break electrical power transfer with variable frequency generators mounted on the high pressure gearbox. Another application occurs during cruise, where power may be transferred from the high pressure spool 85 to the low pressure spool 75 as a trim to a thermodynamic cycle of the turbine engine 20 to improve fuel consumption. Yet another application may occur to transfer power from the high pressure spool 85 to the low pressure spool 75 as a method of decreasing a sizing point for the low pressure turbine 72. Since the high pressure turbine 82 rotates at a higher RPM than the low pressure turbine 72, a specific size and weight of the high pressure turbine 82 as a function of power is smaller. Therefore, it could be advantageous to use the power transfer to transfer power from the high pressure spool 85 to the low pressure spool 75 during engine operating conditions that would have sized the low pressure turbine 72.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

In some examples, the engine 20 includes two spools 75, 85 (e.g., a high spool and a low spool). In other examples, the engine 20 includes one or more intermediate pressure spools that provide for power to be transferred from a lower pressure spool to a higher pressure spool (e.g., the intermediate spool to the high pressure spool, or from the low pressure spool to the intermediate spool).

The aspects disclosed herein apply to many different engine architectures, including but not limited to open rotor engines, turboshaft engines, geared turbofan engines, and three-spool engines.

The present disclosure may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A transmission operatively connected to a turbine engine of an aircraft to selectively transfer power from a first pressure spool of the turbine engine to a second pressure spool of the turbine engine and to power an accessory, the transmission comprising:

a speed changing element connected to one of the first pressure spool and the second pressure spool;

a power transfer clutch connected to the other one of the first pressure spool and the second pressure spool;

an accessory clutch;

a gearset independent from the speed changing element and the power transfer clutch, the speed changing element and the power transfer clutch are positioned between the turbine engine and the gearset and the accessory clutch is positioned between the accessory and the gearset;

wherein the transmission is configured to selectively operate in one of a first configuration and a second configuration;

wherein the first configuration transfers power from the turbine engine to the accessory; and wherein the second configuration transfers power from the first pressure spool to the second pressure spool.

2. The transmission of claim 1, wherein the transmission is configured to operate in a third configuration that prevents the transfer of the power from the turbine engine to the accessory and prevents the transfer of the power from the first pressure spool to the second pressure spool.

3. The transmission of claim 2, further comprising:

the first configuration comprises the accessory clutch engaged to transfer power from the turbine engine to the accessory;

the second configuration comprises the power transfer clutch engaged to transfer power from the first pressure spool to the second pressure spool; and the third configuration comprises engagement of neither of the accessory clutch nor the power transfer clutch.

4. The transmission of claim 2, further comprising a controller with processing circuitry configured to operate the transmission in the first configuration to drive the accessory, in the second configuration to transfer the power produced from the first pressure spool to the second pressure spool, and in the third configuration that prevents the transfer of the power from the turbine engine to the accessory and from the first pressure spool to the second pressure spool.

5. The transmission of claim 1, further comprising:

the first configuration prevents the transfer of the power from the first pressure spool to the second pressure spool; and the second configuration prevents the transfer of the power from the turbine engine to the accessory.

6. The transmission of claim 1, wherein the transmission is configured to transfer power from the second pressure spool to the first pressure spool.

7. The transmission of claim 1, wherein the speed changing element is powered by the second pressure spool in the first configuration.

8. The transmission of claim 1, wherein the power transfer clutch and the accessory clutch are contained within a single housing that is configured to receive the power from the first pressure spool and the second pressure spool.

9. The transmission of claim 8, further comprising:

a piston that extends within the housing;

accessory clutch plates that are connected to the piston;

power transfer clutch plates that are connected to the piston;

wherein the accessory clutch plates are engaged in the first configuration;

wherein the power transfer clutch plates are engaged in the second configuration; and wherein neither of the accessory clutch plates nor the power transfer clutch plates are engaged in a third configuration.

10. The transmission of claim 1, wherein the power transfer clutch comprises a one-way clutch mechanism.

11. A transmission operatively connected to a turbine engine of an aircraft to selectively transfer power from a first pressure spool of the turbine engine to a second pressure spool of the turbine engine and to power an accessory, the transmission comprising:

a speed changing element operatively connected to and powered by the second pressure spool;

a power transfer clutch operatively connected to the first pressure spool;

an accessory clutch operatively connected to the speed changing element;

a gearset independent from the speed changing element and the power transfer clutch, the gearset is positioned between the speed changing element and the accessory and between the power transfer clutch and the accessory;

wherein the power transfer clutch and the accessory clutch are configured in a first configuration to transfer power through the gearset from the second pressure spool to the accessory to power the accessory; and wherein the power transfer clutch and the accessory clutch are configured in a second configuration to transfer power through the gearset from the first pressure spool to the second pressure spool.

12. The transmission of claim 11, wherein each of the speed changing element, the power transfer clutch, and the accessory clutch are separate components.

13. The transmission of claim 11, further comprising a controller with processing circuitry configured to operate the transmission in the first configuration to drive the accessory and in the second configuration to transfer the power produced from the first pressure spool to the second pressure spool.

14. A transmission operatively connected to a turbine engine of an aircraft to selectively transfer power from a low pressure spool of the turbine engine to a high pressure spool of the turbine engine and to power an accessory, the transmission comprising:

a speed changing element connected to the high pressure spool;

a power transfer clutch connected to the low pressure spool;

an accessory clutch;

a gearset independent from the speed changing element and the power transfer clutch, the speed changing element and the power transfer clutch are positioned between the turbine engine and the gearset and the accessory clutch is positioned between the accessory and the gearset;

wherein the transmission is configured to selectively operate in one of a first configuration and a second configuration;

wherein the first configuration transfers power from the turbine engine to the accessory; and wherein the second configuration transfers power from the low pressure spool to the high pressure spool.

15. The transmission of claim 14, wherein the transmission is configured to operate in a third configuration that prevents the transfer of the power from the turbine engine to the accessory and prevents the transfer of the power from the low pressure spool to the high pressure spool.

16. The transmission of claim 15, further comprising:

the first configuration comprises the accessory clutch engaged to transfer power from the turbine engine to the accessory;

the second configuration comprises the power transfer clutch engaged to transfer power from the low pressure spool to the high pressure spool; and the third configuration comprises engagement of neither of the accessory clutch nor the power transfer clutch.

17. The transmission of claim 15, further comprising a controller with processing circuitry configured to operate the transmission in the first configuration to drive the accessory, in the second configuration to transfer the power produced from the low pressure spool to the high pressure spool, and in the third configuration that prevents the transfer of the power from the turbine engine to the accessory and from the low pressure spool to the high pressure spool.

18. The transmission of claim 14, further comprising:

the first configuration prevents the transfer of the power from the low pressure spool to the high pressure spool; and the second configuration prevents the transfer of the power from the turbine engine to the accessory.

19. The transmission of claim 14, wherein the power transfer clutch and the accessory clutch are contained within a single housing that is configured to receive the power from the low pressure spool and the high pressure spool.

20. The transmission of claim 14, wherein the power transfer clutch comprises a one-way clutch mechanism.

* * * * *